United States Patent
Prabhala et al.

(10) Patent No.: US 11,038,374 B2
(45) Date of Patent: Jun. 15, 2021

(54) FLEXIBLE BRIDGE AMPLIFIER FOR WIRELESS POWER

(71) Applicant: Infineon Technologies Austria AG, Villach (AT)

(72) Inventors: Venkata Anand Prabhala, El Segundo, CA (US); Stephan Schaecher, Munich (DE)

(73) Assignee: Infineon Technologies Austria AG, Villach (AT)

(*) Notice: Subject to any disclaimer, the term of this patent is extended or adjusted under 35 U.S.C. 154(b) by 180 days.

(21) Appl. No.: 15/490,587

(22) Filed: Apr. 18, 2017

(65) Prior Publication Data

US 2018/0301934 A1   Oct. 18, 2018

(51) Int. Cl.
| | |
|---|---|
| H02J 50/12 | (2016.01) |
| H02J 7/02 | (2016.01) |
| H02J 7/04 | (2006.01) |
| H02M 7/5387 | (2007.01) |
| H02J 50/40 | (2016.01) |
| H02J 7/00 | (2006.01) |
| H02M 1/00 | (2006.01) |

(52) U.S. Cl.
CPC ........ *H02J 50/12* (2016.02); *H02J 7/007192* (2020.01); *H02J 7/025* (2013.01); *H02J 7/045* (2013.01); *H02J 50/40* (2016.02); *H02M 7/53871* (2013.01); *H02M 2001/0019* (2013.01)

(58) Field of Classification Search
CPC .. H02J 50/12; H02J 7/025; H02J 7/045; H02J 50/40; H02J 7/047; H02M 7/53871; H02M 2001/0019
See application file for complete search history.

(56) References Cited

U.S. PATENT DOCUMENTS

2009/0179698 A1* 7/2009 Ichitsubo ............. H03G 3/3036
330/133
2011/0285349 A1   11/2011 Widmer et al.
(Continued)

FOREIGN PATENT DOCUMENTS

EP   2642628 A1   9/2013
WO   2014001983 A1   1/2014

OTHER PUBLICATIONS

Jay, et al., "Resonant Coupling Analysis for a Two-Coil Wireless Power Transfer System," IEEE Dallas Circuits and Systems Conference, Oct. 2014, 4 pp.
(Continued)

*Primary Examiner* — Daniel Kessie
(74) *Attorney, Agent, or Firm* — Shumaker & Sieffert, P.A.

(57) ABSTRACT

A wireless power transfer (WPT) system that efficiently transfers power to portable devices over a wide range of load conditions and power output demands. The WPT system of this disclosure includes a full bridge topology. Changing the number of devices or the position and orientation of a device on the transmitter charge area may change the impedance and/or the load on the power transmitting unit (PTU). The WPT system of this disclosure may detect load impedance and/or power requested from the PTU. When the load exceeds a threshold, the WPT system will activate a second half bridge to operate in full-bridge mode. Similarly, the WPT system may detect the power requested and received and when the power drops to a certain threshold of power transmitted the WPT may turn off the second leg and operate in half-bridge mode.

19 Claims, 13 Drawing Sheets

(56) References Cited

U.S. PATENT DOCUMENTS

| | | | | |
|---|---|---|---|---|
| 2012/0293118 | A1* | 11/2012 | Kim | H02J 50/80 320/108 |
| 2014/0159500 | A1 | 6/2014 | Sankar et al. | |
| 2015/0069855 | A1 | 3/2015 | De Rooij et al. | |
| 2015/0180345 | A1 | 6/2015 | Frost | |
| 2016/0336804 | A1* | 11/2016 | Son | H02J 7/025 |
| 2017/0018965 | A1* | 1/2017 | Lee | H02J 50/60 |
| 2017/0222466 | A1* | 3/2017 | Sankar | H02J 7/025 307/104 |
| 2017/0133884 | A1* | 5/2017 | Walley | H02J 50/40 |
| 2017/0229921 | A1* | 8/2017 | Hwang | H02J 50/12 |
| 2018/0212464 | A1* | 7/2018 | Liu | H02J 50/10 |

OTHER PUBLICATIONS

La Rosa, "Input and Output Impedance," retrieved from www.bramcam.nl/Diversen/2013_Input_output_impedance_9.pdf, accessed on Feb. 13, 2017, 20 pp.

Honda et al. "Class D Audio Amplifier Design," International Rectifier, www.irf.com, Oct. 8, 2003, 54 slides.

Bogicevic, et al., Graph-Analytical Method of Determining Impedance in Electrical Transformers, Mathematical Problems in Engineering, vol. 2015, Oct. 2015, 11 pp.

Chirila, "How to Build a Class-D Power Amp," allaboutcircuits.com, Aug. 29, 2016, 18 pp.

"9. Impedance and Phase Angle," accessed from http://www.intmath.com/complex-numbers/9-impedance-phase-angle.php, Interactive Mathematics, May 31, 2016, 5 pp.

"Review of R,X, and Z," accessed on Feb. 13, 2017 from https://www.allaboutcircuits.com/textbook/alternating-current/chpt-5/review-of-r-x-and-z/, 2 pp.

"Simple Pre-Regulator," EEWeb, Electrical Engineering Community, accessed from, https://www.eeweb.com/blog/extreme_circuits/simple-pre-regulator, Apr. 29, 2013, 2 pp.

"Simple switchers make simple pre-regulators," Electronic Design, http://electronicdesign.com/boards/simple-switchers-make-simple-pre-regulators, Jul. 7, 1997, 3 pp.

Roy, "Introduction to RT1650 Wireless Power Receiver," Richtek Technologies Corporation, Sep. 2015, 15 pp.

Extended European Search Report from counterpart European Patent Application No. 18166258.6, dated Sep. 3, 2018, 10 pp.

Examination Report from counterpart European Application No. 18166258.6, dated Sep. 20, 2019, 6 pp.

* cited by examiner

FLEXIBLE BRIDGE AMPLIFIER FOR WIRELESS POWER

TECHNICAL FIELD

The disclosure relates to wireless power transfer.

BACKGROUND

Wireless charging allows portable devices users to recharge the internal battery of a portable device without a charging cable. Some examples of portable devices include mobile phones, tablet computers, fitness trackers and other portable devices. Different types of devices may require different power to be output from the wireless charger. For example, a tablet computer may draw more power than a fitness tracker during charging. Some wireless charging solutions may be able to charge more than one device at a time. A wireless charging solution may therefore be challenged to operate over a range of power output levels and load conditions.

SUMMARY

In general, the disclosure is directed to a wireless power transfer (WPT) system that efficiently transfers power to portable devices over a wide range of load conditions and power output demands. In some examples, the WPT system operates at a switching frequency in kHz or MHz range, and the switching and driver losses are a major part of the total losses of the power amplifier. Reducing driver and switching losses helps improve the system efficiency, especially during half-bridge operation. The WPT system of this disclosure reduces driver and switching losses by operating in either a half-bridge mode or a full bridge mode and automatically changing between modes to efficiently deliver power to portable devices over a wide range of load and power output conditions.

The WPT system of this disclosure may include a full bridge class D zero voltage switching (ZVS) topology power amplifier as well as other, similar topologies. In full bridge mode, both half bridges operate synchronously with a high input voltage when the load and/or the power requirements are high. However, full bridge topologies may be less efficient in low power and low impedance operation. The amplifier is operated in half bridge mode by turning off and keeping off the high side switch of one of the half bridges and turning on and keeping on the low side switch of that same half bridge. The half bridge operation may reduce the driver and switching losses by eliminating driver and switching losses of the turned off half-bridge and therefore may improve the overall system efficiency of the WPT system.

In one example, the disclosure is directed to a method comprising: determining, by a sense and control unit, an output impedance of a power transfer circuit and determining, by a sense and control unit, an output power of the power transfer circuit. In response to determining that the output impedance is greater than an output impedance threshold or that the output power is greater than an output power threshold, selecting, by the sense and control unit, a full-bridge mode of operation of the power transfer circuit, and in response to determining that the output impedance is less than the output impedance threshold or that the output power is less than the output power threshold, selecting, by the sense and control unit, a half-bridge mode of operation of the power transfer circuit.

In another example, the disclosure is directed to a sense and control circuit, comprising: a first sensing circuitry, wherein the first sensing circuitry is configured to determine an impedance reflected to a power amplifier circuit, a second sensing circuitry, wherein the second sensing circuitry is configured to determine an output power of the power amplifier circuit, and a third sensing circuitry, wherein the third sensing circuitry is configured to determine a DC input voltage of the power amplifier circuit. In response to determining that: the impedance reflected to the power amplifier circuit is greater than an impedance threshold, the output power is greater than an output power threshold, or that the DC input voltage is greater than a DC input voltage threshold, the sense and control circuity is configured to select a full-bridge mode of operation of the power amplifier circuit. In response to determining that: the impedance reflected to the power amplifier circuit is less than the impedance threshold, the output power is less than the output power threshold, or that the DC input voltage is less than a DC input voltage threshold, the sense and control circuit is configured to select a half-bridge mode of operation of the power amplifier circuit.

In another example, the disclosure is directed to a device for wireless power transfer, the device comprising: a power amplifier circuit and a sense and control circuit. The power amplifier circuit includes: a first half-bridge circuit comprising a first high side switch and a first low side switch, and a second half-bridge circuit comprising a second high side switch and a second low side switch, wherein the first half-bridge circuit and the second half-bridge circuit are arranged as a full-bridge circuit. The sense and control circuit is configured to: determine an impedance reflected to the power amplifier circuit, determine an output power of the power amplifier circuit, in response to determining that the impedance reflected to the power amplifier circuit is greater than an impedance threshold or that the output power is greater than an output power threshold, select a full-bridge mode of operation of the power amplifier circuit. In response to determining that the impedance reflected to the power amplifier circuit is less than the impedance threshold or that the output power is less than the output power threshold, select a half-bridge mode of operation of the power amplifier circuit.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
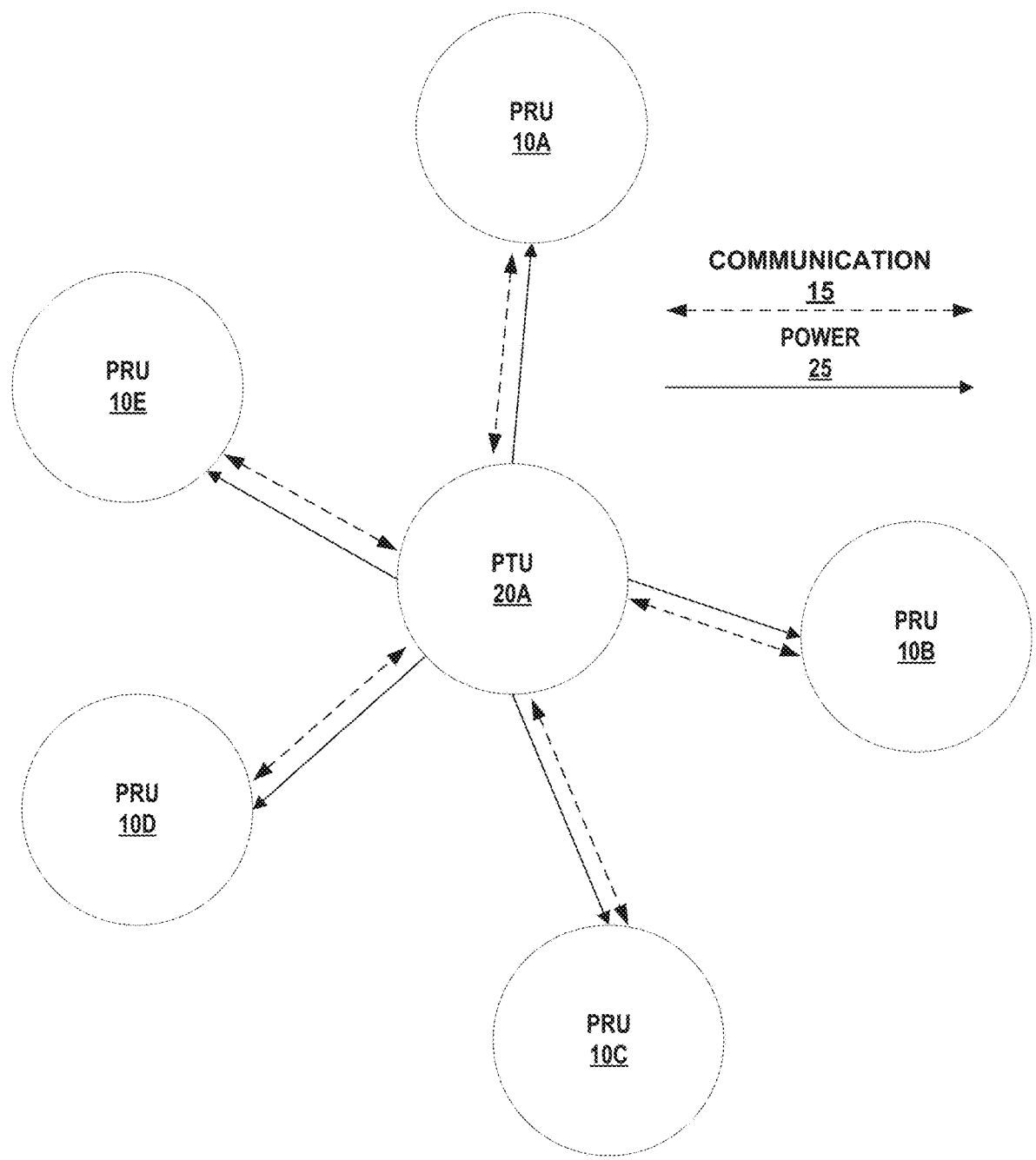
FIG. 1A is a conceptual diagram illustrating an example wireless power transfer system that may transfer power to more than one receiving unit.

In general, the disclosure is directed to a wireless power transfer (WPT) system that efficiently transfers power to portable devices over a wide range of load conditions and power output demands. In some examples, the WPT system operates at a switching frequency in kHz or MHz range, the switching and driver losses are a major part of the total losses of the power amplifier. Reducing driver and switching losses helps improve the system efficiency, especially during half-bridge operation. The WPT system of this disclosure reduces driver and switching losses by operating in either a half-bridge mode or a full bridge mode and automatically changing between modes to efficiently deliver power to portable devices over a wide range of load and power output conditions.

The WPT system of this disclosure may include a full bridge class D zero voltage switching (ZVS) topology, or some other similar topology. In full bridge mode, both half bridges operate synchronously with a high input voltage when the load and/or the power requirements are high. However, full bridge topologies may be less efficient in low power and low impedance operation. The amplifier is operated in half bridge mode by turning off and keeping off the high side switch of one of the half bridges and turning on and keeping on the low side switch of that same half bridge. The half bridge operation may reduce the driver and switching losses and may improve the system efficiency of the WPT.

With a resonant configuration, a WPT may simultaneously charge multiple devices and multiple devices of different types on the transmitter charge area. Changing the position and orientation of a device on the transmitter charge area may change the impedance reflected back to the power transmitting unit (PTU) of the WPT. This can lead to significantly different load conditions. For example, a tablet computer, a power receiving unit (PRU), when centered on the transmitter charge area in a first orientation may efficiently operate to transfer power in half-bridge mode. However, moving the tablet computer toward an edge of the transmitter charge area and changing the orientation of the tablet computer may require the PTU to switch to full bridge mode to deliver enough power to charge the tablet computer.

The WPT system of this disclosure may detect load impedance reflected to the PTU and when the load exceeds a threshold, the WPT system will activate the second half bridge to operate in full bridge mode. Similarly, the WPT system may detect the power requested and when the power drops to a certain threshold of power transmitted the WPT may turn off the second leg of the power amplifier and operate in half-bridge mode.

In other examples, the WPT system of this disclosure may sense the DC input voltage to the power amplifier to determine whether to switch to full-bridge or half-bridge mode. The WPT system may increase or decrease the DC input voltage to the power amplifier in response to the demands on system operation, discussed above. The magnitude of the DC input voltage is therefore related to both the reflected impedance to the power amplifier as well as power output of the power amplifier. By monitoring the DC input voltage, the WPT system may determine whether to switch between full-bridge and half-bridge modes for best system efficiency because of either load impedance or power demand changes, such as by changing the number or orientation of devices in the transmitter charging area.

The description of this disclosure will focus on resonant inductive techniques, such as described in the Alliance for Wireless Power (A4WP) Rezence standard. However, similar techniques may also be applied to WPT systems that operate under the low power Qi magnetic resonance standard of the Wireless Power Consortium (WPC), Power Matters Alliance (PMA) standards or other wireless power transfer standards.

FIG. 1A is a conceptual diagram illustrating an example wireless power transfer system that may transfer power to more than one receiving unit. FIG. 1A illustrates PTU 20A that delivers wireless power to PRUs 10A-10E. In some examples, PTU 20A may deliver power to more or fewer PRUs than shown in FIG. 1A. Some examples of PRUs 10A-10E may include phones, notebook computer, notebook accessories, such as a wireless mouse, wearables, smartwatches, tablet computers and other battery operated devices such as power tool batteries. In some examples PTU 20A may be a Class 4 transmitter system with a target design point and maximum efficiency at certain maximum load, such as 33 W. An example load of 33 W may corresponds to 1 Cat4 receiver in a tablet (13 W), two Cat3 Receivers in a smartphone (6.5 W) and three Cat1 and 2 smartwatches or fitness trackers. Other example power levels may include higher power levels, such as 70 W.

PTU 20A may include a control and communication protocol for the WPT system, which may provide feedback of the PRU characteristics to the PTU to optimize efficiency and fault protection. The two-way communication between PTU 20A and PRUs 10A-10E are indicated by communication links 15. The power transfer between PRU 10A and PRUs 10A-10E is indicated by power links 25.

In operation, a user may move a charging item (e.g. a Smartphone or other device that supports wireless charging) freely within the transmitter charging area and PTU 20A may provide a satisfactory power level to operate or charge the item. Multiple items may be charged, which may greatly vary the power level that PTU 20A must provide. The load conditions on PTU 20A may also varying depending on which types of items (e.g. notebook computer or fitness tracker) and on the position and orientation of the items on the transmitter charging area. A transmitter charging area may also be referred to as a charging surface. The techniques of this disclosure may improve the efficiency of the power amplifier in the power transmitting unit of the WPT system, especially during low power and low impedance operation. A WPT system may also be called a wireless charging system. The techniques of this disclosure may extend the power range for the efficient operation of the power amplifier within PTU 20A.

Figure 1B:
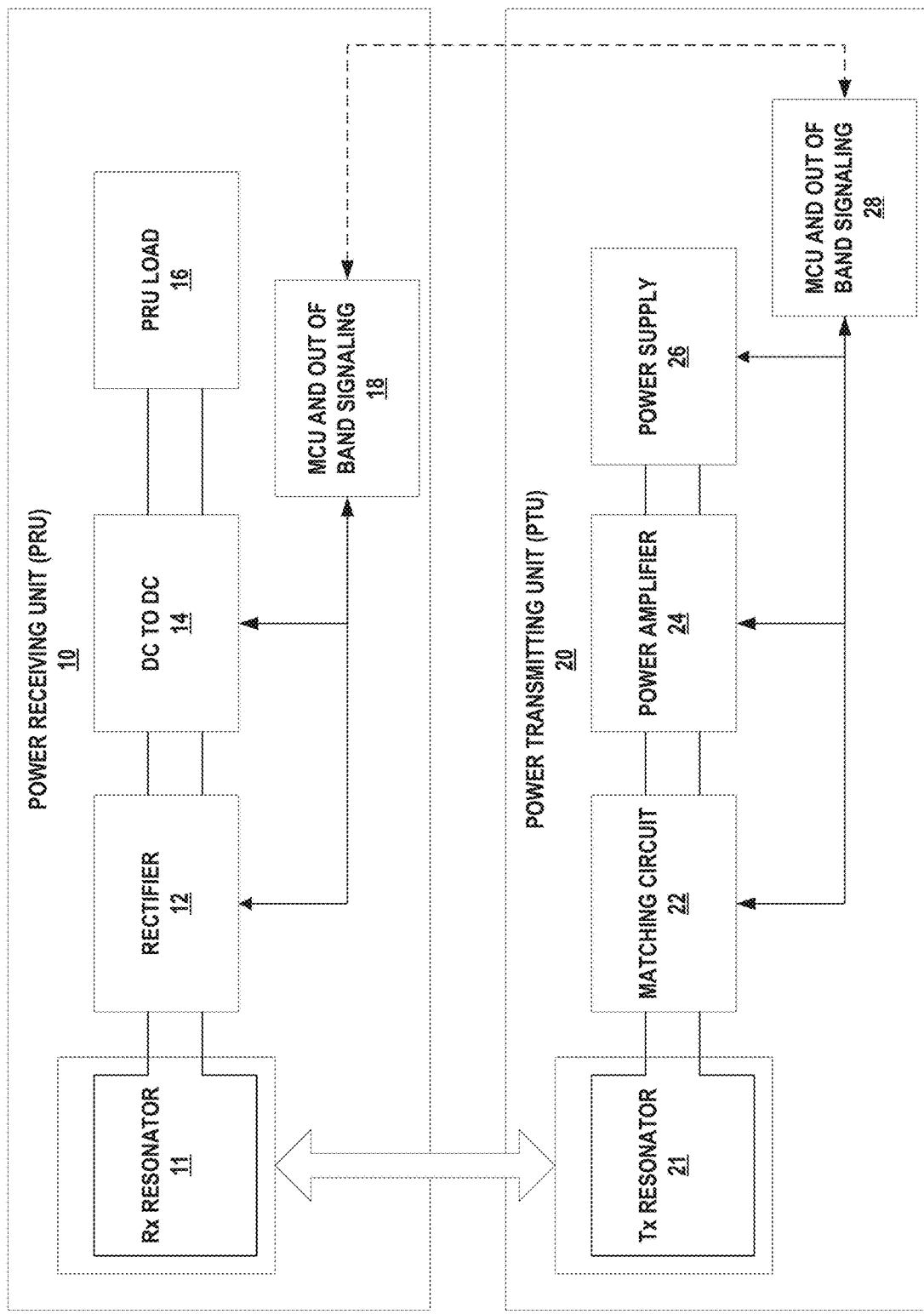
FIG. 1B is a block diagram illustrating some internal components of an example power transfer unit (PTU) and power receiving unit (PRU).

FIG. 1B is a block diagram illustrating some internal components of an example PTU and PRU. Other examples of PTU or PRU may include more or fewer components and some functions shown in the example of FIG. 1B may be combined or contained in different functional blocks than those shown. For example, rectifier 12 of PRU 10 may include a matching circuit, not shown in FIG. 1B.

PRU 10 corresponds to PRUs 10A-10E depicted in FIG. 1A and may be a phone, tablet or similar device with or without an internal battery. PRU 10 includes a receiver (Rx) resonator 11, rectifier 12, DC to DC converter 14, PRU load 16 and MCU 18.

Rx resonator 11 may be a coil, or similar structure that receives power coupled from PTU 20. Rx resonator 11 may be tuned to operate within a particular frequency range, such as 6.7 to 6.9 MHz, or tuned to a particular frequency.

Rectifier 12 converts the alternating current (AC) from Rx resonator 11 into direct current (DC) and transfers the power signal to DC to DC converter 14. Rectifier 12 may also send information and receive commands from MCU 18. For example, rectifier 12 may determine the power level or current flow from Rx resonator 11 and send a signal to MCU 18 indicating the determined power level or current flow.

DC to DC converter 14 may convert the voltage level of the signal from rectifier 12 into a higher or lower voltage for use by PRU load 16. DC to DC converter 14 may also sense information related to the operation of PRU 10 and send signals to MCU 18 indicating voltage, current or similar information. For example, DC to DC converter 14 may detect the input voltage to DC to DC converter 14 and the output voltage DC to DC converter 14 to PRU load 16 and communicate the voltage values to MCU 18.

PRU load 16 may include an internal battery that powers PRU 10 when not connected to PTU 20. In other examples, PRU load 16 may directly power the operation of PRU 10.

MCU 18 may comprise any type of processor including a microcontroller (MCU), e.g. a computer on a single integrated circuit containing a processor core, memory, and programmable input/output peripherals, a microprocessor (μP), e.g. a central processing unit (CPU) on a single integrated circuit (IC), or other types of controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. MCU 18 may receive signals indicating the voltage, current, power or other such signals from the components of PRU 10, such as rectifier 12 and DC to DC converter 14. MCU 18 may control certain functions PRU 10 as will has include the communication and signaling instructions and circuitry for communicating with PTU 20.

MCU 18 may send information received from the sensors, such as the voltage level, to PTU 20, which may impact the operation of PTU 20.

PTU 20, in the example of FIG. 1B includes a transmitter (Tx) resonator 21, matching circuit 22, power amplifier 24, power supply 26 and MCU 28. PTU 20 may operate as a WPT system under the Rezence standard or other WPT standard.

Tx resonator 21 may be similar Rx resonator 11 in that it may comprise a coil or similar structure that transfers the power received from power amplifier 24 to one or more Rx resonator coils in one or more PRUs that are within the transmitter charge area. Matching circuit 22 matches the input impedance of Tx resonator 21 to the output impedance of power amplifier 24. PTU 20 may also be called a power transfer circuit.

Power amplifier 24 may comprise a full bridge power amplifier that may operate as a half-bridge power amplifier at lower power or load impedance. In some examples, power amplifier 24 comprises two half-bridge circuits arranged as two legs of an H-bridge. In some examples, power amplifier 24 of PTU 20 may include class D, zero voltage switching (ZVS) circuit topology, or another similar topology.

Full bridge topologies may have advantages for high power applications, but full-bridge topologies may have low efficiency during low power and low impedance operation. When operating as a half-bridge amplifier, one of the two half-bridges of power amplifier 24 may be disabled. In full-bridge mode, both half-bridge amplifier circuits may operate synchronously. In this manner, power amplifier 24 may be configured for efficient operation for the entire range of expected power demand and range of load impedances for PTU 20. In this disclosure, full bridge mode may be considered equivalent to high power mode and half bridge mode may be considered equivalent to a low power mode. However, as discussed throughout this disclosure, selecting full-bridge or half-bridge mode may depend, not only on the amount of power to be delivered, but also the reflected impedance or the level of DC supply voltage to the power amplifier.

MCU 28 of PTU 20 may be similar to MCU 18 in that MCU 28 may comprise any type of processor as described above and may include the communication functions to transfer information and commands between PTU 20 and PRU 10.

MCU 28 may select between full-bridge operation and half-bridge operation depending on one or more factors. One factor may be the type or number of devices or PRUs within the transmitter charging area. For example, PRU 10 may deliver significantly more power for a notebook computer than for one or more fitness trackers. A notebook computer or multiple different devices may cause the power requested from PRU 10 to exceed an output power threshold. MCU 28 may select full-bridge mode to supply the higher power needed.

A second factor that may be used by MCU 28 to select the mode of operation is the load impedance reflected to power amplifier 24. For example, a PRU, such as a phone, may be oriented on the charging surface such that Tx resonator 21 and Rx resonator 11 may transfer power with high efficiency. Therefore, the load impedance reflected to power amplifier 24 may be less than an impedance threshold. MCU 28 may select half-bridge mode, which may lower the driver and switching losses of power amplifier 24 and PRU 10 and therefore be more efficient at the lower impedance. A phone placed on an edge of the charging surface or with an orientation such that Tx resonator 21 and Rx resonator 11 are less efficient may exceed an impedance threshold and cause MCU 28 to select high power or full-bridge mode.

In other examples, MCU 28 may sense the DC input voltage ($V_{DCin}$) to power amplifier 24 to determine whether to switch to full-bridge or half-bridge mode. MCU 28 may increase or decrease the DC input voltage from power supply 26 to power amplifier 24 in response to the demands on system operation, discussed above. The magnitude of $V_{DCin}$ is related to both the reflected impedance to power amplifier 24 as well as power output of power amplifier 24. By monitoring the DC input voltage, the WPT system may determine whether to switch between full-bridge and half-bridge modes for best system efficiency because of either load impedance or power demand changes.

MCU 28 may be referred to as a sense and control unit or sense and control circuit for PTU 20. MCU 28 may adjust the output power threshold, the impedance threshold, $V_{DCin}$ threshold or other threshold based in part on operating conditions of PTU 20. Operating conditions may include ambient temperature, maximum power supply voltage, maximum resonator currents and similar factors. In some examples, MCU 28 may monitor the device temperature and if the device temperature exceeds a threshold, MCU 28 may stop delivering power. A high device temperature may indicate a problem with the battery and shutting off the power may prevent device damage, fire or explosion. Similarly, MCU 28 may decrease or shut down power amplifier 24 in response to a resonator current exceeding a threshold, which may prevent damage to the resonator or other system components.

Figure 2A:
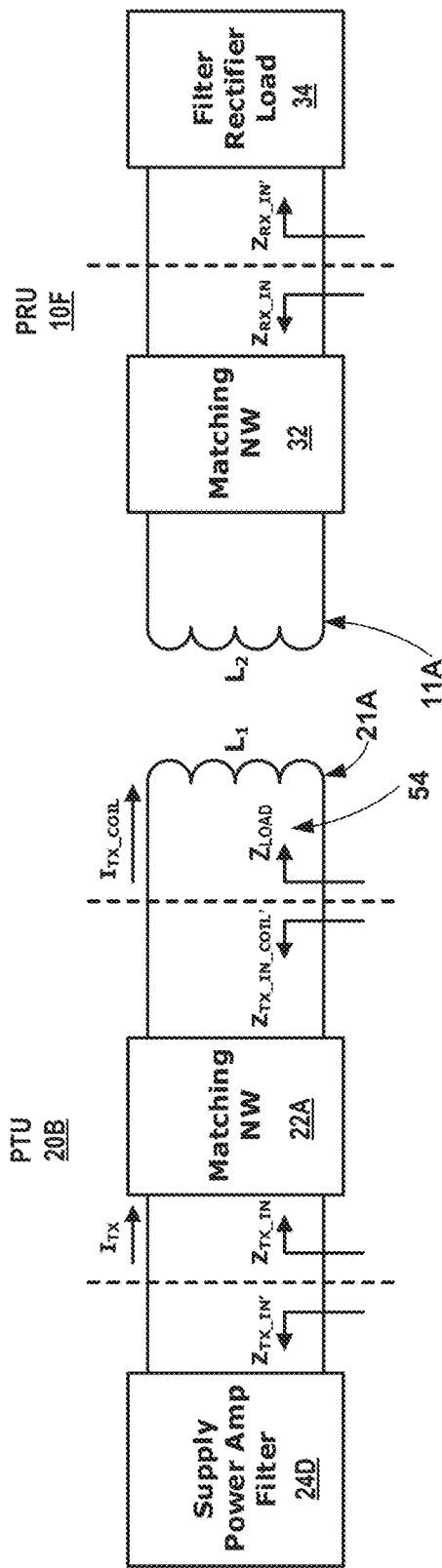
FIG. 2A is a block diagram illustrating an example PTU and PRU depicting the impedances that reflected to other components.

FIG. 2A is a block diagram illustrating an example PTU and PRU depicting the impedances that reflected to other components. The components of PRU 10F and PTU 20B correspond to similar components depicted in FIGS. 1A and 1B.

FIG. 2A depicts $Z_{LOAD}$ 54, which is the impedance reflected to power amplifier 24D of PTU 20B. In other words, $Z_{LOAD}$ 54 is the impedance that power amplifier 24D sees at the output of power amplifier 24D, which is different than an output impedance of power amplifier 24D. $Z_{LOAD}$ 54 is the filter rectifier load 34 from PRU 10F reflected through matching network 32, Rx resonator 11A (L2), and Tx resonator 21A (L1). Power amplifier 24D may correspond to power amplifier 24 depicted in FIG. 1B as well as power amplifiers 24A-24C depicted in FIGS. 3A-3C below.

Figure 2B:
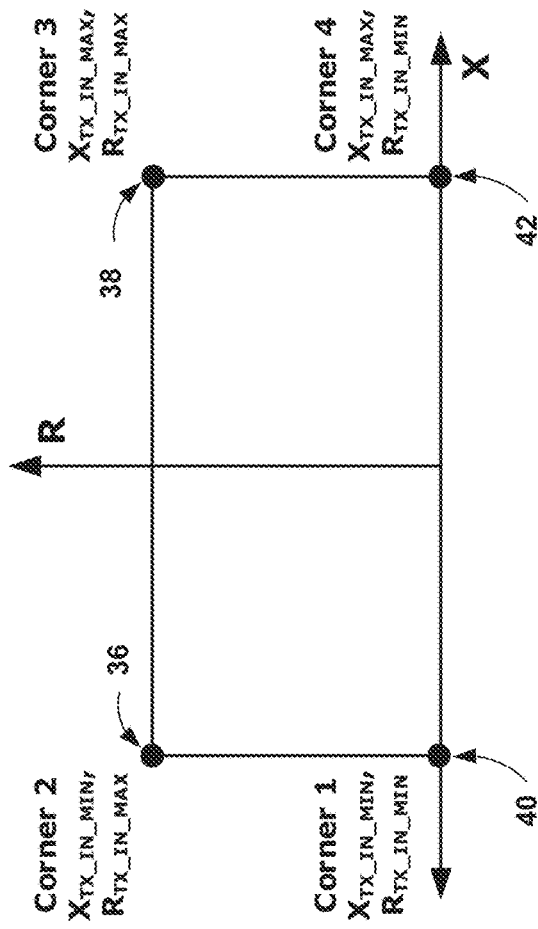
FIG. 2B is a graph depicting the range of impedances over which a WPT system may operate.

FIG. 2B is a graph depicting the range of impedances over which a WPT system may operate. The Y-axis of FIG. 2B indicates the real portion, or resistance, of the impedance. The X-axis indicates the imaginary portion of the impedance. Operating corners 36, 38, 40 and 42 indicate the maximum and minimum impedance corners over which a PTU, such as PTU 20B in FIG. 2A, may operate. A sense and control unit for a PTU, such as MCU 28, may select full-bridge mode or half-bridge mode in response to the impedance exceeding an impedance threshold.

Figure 2C:
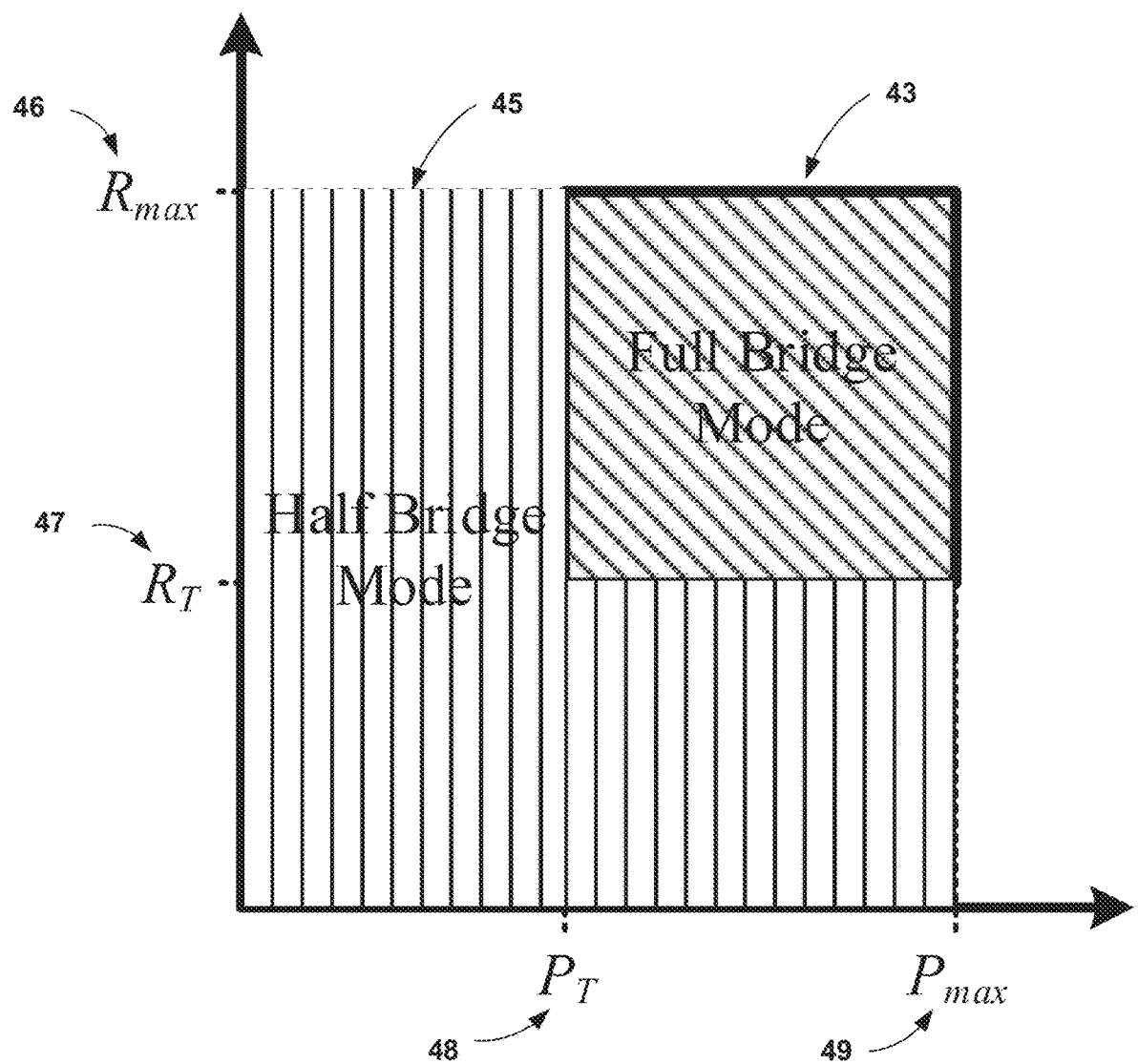
FIG. 2C is a graph illustrating the operating mode of a WPT system over both power and impedance operating ranges.

FIG. 2C is a graph illustrating the operating mode of a WPT system over both power and impedance operating ranges. The sense and control unit may select full-bridge mode 43 if the sense and control unit senses the output power of the power amplifier, such as power amplifier 24 of the power transfer circuit, such as PTU 10, exceeds an output power threshold $P_T$ 48. In some examples, $P_T$ 48 may be selected as half or less than half of the maximum rated output power $P_{max}$ 49.

Similarly, the sense and control unit may select full-bridge mode 43 when the impedance reflected to the power amplifier exceeds an impedance threshold $R_T$ 47. In some examples, $R_T$ 47 may be selected as half or less than half of the maximum rated impedance $R_{max}$ 46. In examples where the operating point of the power transfer circuit, including the power amplifier, is less than the power threshold $P_{max}$ 49 or the impedance threshold $R_{max}$ 46, the sense and control unit may select half-bridge mode 45. In other examples, the mode transition points be set to 65% of the maximum transmit power, or half of the load resistance range. In some examples, the sense and control unit may smoothly transition between full-bridge and half-bridge mode by selecting a continuous mode transition scheme. The continuous mode transition will be explained in more detail in relation to FIGS. 4C-4E.

Figure 3A:
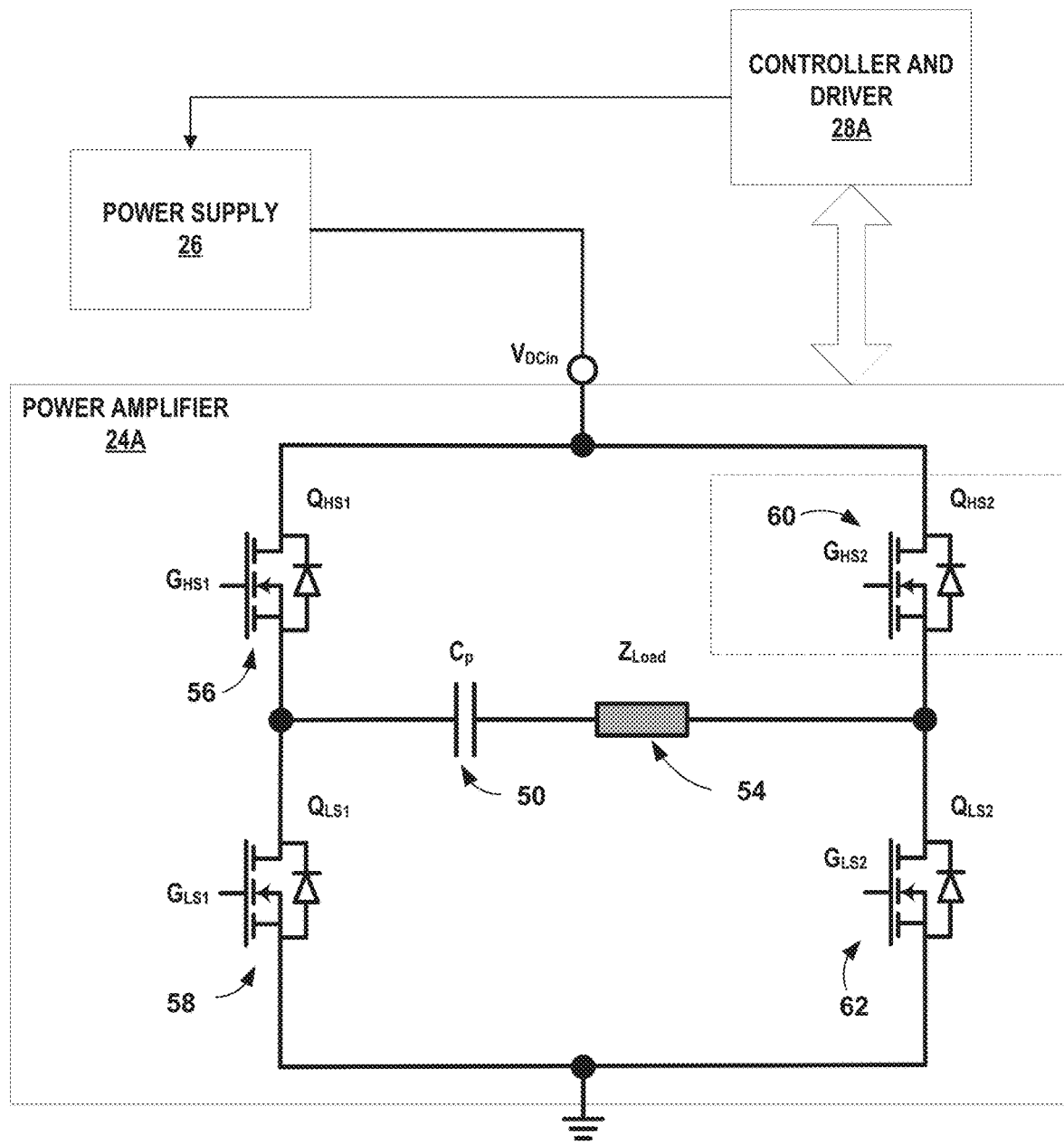
FIG. 3A is a schematic and block diagram illustrating a power amplifier circuit that is part of a device for wireless power transfer, in accordance with one or more techniques of this disclosure.
Figure 3B:
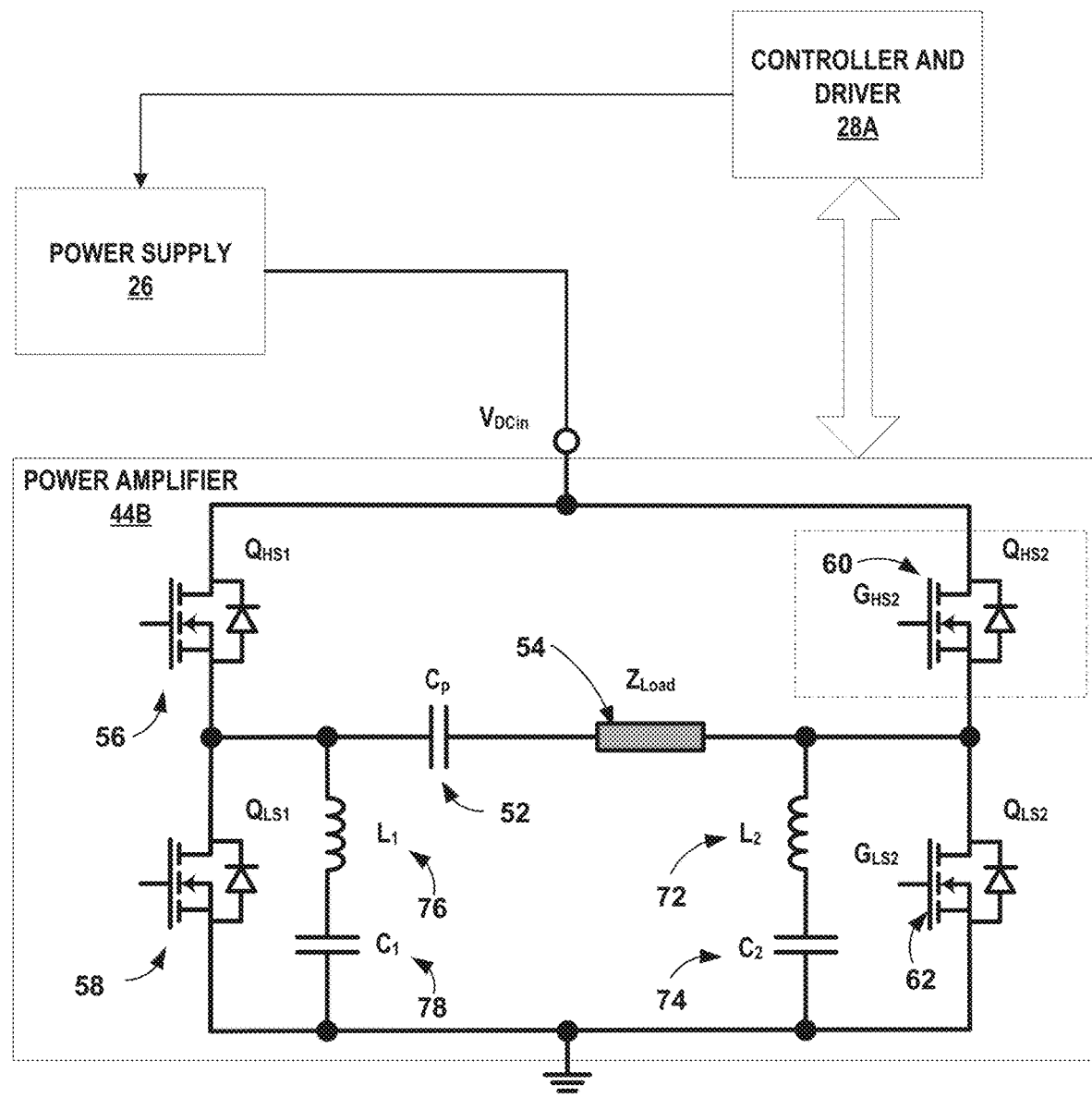
FIG. 3B is schematic and block diagram of another example power amplifier circuit configuration, according to one or more techniques of this disclosure.
Figure 3C:
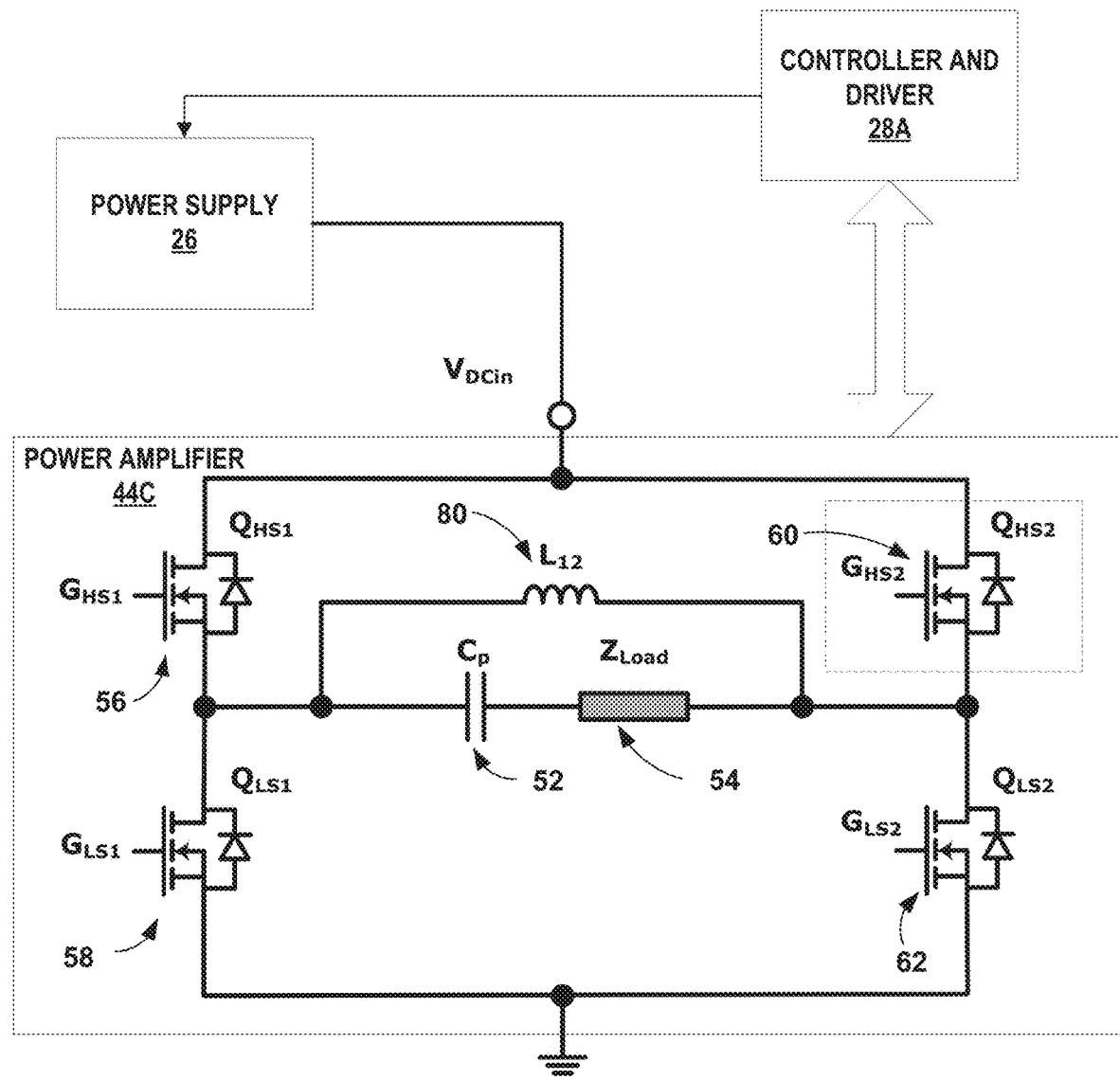
FIG. 3C is a schematic and block diagram illustrating another example topology of a power amplifier for use in a WPT system, in accordance with one or more techniques of this disclosure.

FIGS. 3A-3C illustrate several examples of power amplifier circuits that may be operated according to the techniques of this disclosure. The power amplifier circuits of FIGS. 3A-3C are full-bridge amplifier circuits arranged as an H-bridge of two half-bridge amplifiers. When in half-bridge mode, one of the half-bridges is disabled by turning off and leaving off a high side switch and turning on and leaving on a low side switch. In some examples, power amplifier circuits that are part of power transfer circuit may be example configurations of a class D, zero voltage switching (ZVS) circuit topology. The topologies depicted in FIGS. 3A-3C are examples of power supply topologies that may be used by a WPT system, as described in this disclosure. Other power supply topologies, though not shown, may also be used by a WPT system according to the techniques of this disclosure. Power amplifiers 24A-24C may correspond to power amplifier 24 depicted in FIG. 1B.

FIG. 3A is a schematic and block diagram illustrating a power amplifier circuit that is part of a device for wireless power transfer. Some components in FIG. 3A correspond to components in other figures. For example, power supply 26 in FIG. 3A corresponds to power supply 26 depicted in FIG. 1B. Similarly, controller and driver 28A may correspond to MCU 28 shown in FIG. 1B. Controller and driver 28A may also be referred to as a sense and control circuit. Though the example of FIGS. 3A-3C depict n-channel MOSFETS, the power amplifiers may also be configured to use p-channel devices.

Power amplifier 24A includes a first half-bridge circuit including a first high side switch QHS1 56 and a first low side switch QLS1 58, and a second half-bridge circuit including a second high side switch QHS2 60 and a second low side switch QLS2 62. The first half-bridge circuit and the second half-bridge circuit are arranged as a full-bridge circuit.

Controller and driver 28A may comprise a sense and control circuit that is configured to sense parameters in power amplifier 24A. In some examples controller and driver 28A may also receive signals from a PRU via the communication links as depicted in FIGS. 1A and 1B. Controller and driver 28A may be included in MCU 28 depicted in FIG. 1B, or may be a separate functional block in communication with MCU 28.

Controller and driver 28A may include a first sensing circuitry and a second sensing circuitry. The first sensing circuitry may be configured to determine an impedance reflected to a power amplifier circuit. The second sensing circuitry may be configured to determine an output power of the power amplifier circuit. Controller and driver 28A may control both the mode (half-bridge or full-bridge) as well as the output of power amplifier 24A by controlling the gate voltages of the high side and low side switches (GHS1 56, GHS2 60, GLS1 58 and GLS2 62). This will also be described in more detail in relation to FIGS. 4A-4E below.

Power supply 26 supplies a DC voltage input VIN to the drains of high side switches QHS1 56 and QHS2 60. In this disclosure, VIN may also be called $V_{DCin}$. In some examples $V_{DCin}$ may come from a pre-regulator. The source of high side switch QHS1 56 connects to the drain of low side switch QLS1 58 at node SW1. The source of high side switch QHS2 60 connects to the drain of low side switch QLS2 62 at node SW2. The sources of low side switches QLS1 58 and QLS2 62 connect to ground, in the example of FIG. 3A. Node SW1 connects to capacitor Cp 50, which connects in series to Zload 54 and further to node SW2. Zload 54 corresponds to Zload 54 depicted in FIG. 2A. The impedance reflected through combined resonator and matching circuit (e.g. Tx resonator 21 and matching circuit 22) replace Zload 54 in FIGS. 3A-3C.

In the example of FIGS. 3A-3C, capacitor Cp 50 is a single element matching capacitor. However, in other examples, Cp 50 may be replaced by a matching circuit, such as matching circuit 22. In these examples, Cp 50 may be a multi-element matching array, that may be controlled by MCU 28, and/or controller and driver 28A to match the impedance of the load to maximize transmission of power from power supplies 24A-24C.

During operation, in response to determining that the impedance reflected to the power amplifier circuit 24A is greater than an impedance threshold, such as $R_T$, or that the output power is greater than an output power threshold, such as $P_T$, controller and driver 28A is configured to select a full-bridge mode of operation of the power amplifier circuit 24A. Further, in response to determining that the impedance reflected to power amplifier circuit 24A is less than the impedance threshold or that the output power is less than the output power threshold, controller and driver 28A is configured to select a half-bridge mode of operation of the power amplifier circuit. Controller and driver 28A may select the half-bridge mode of operation by disabling a first half-bridge of the power amplifier circuit. In some examples, controller and driver 28A disables the first half-bridge circuit by turning off a first high side switch, e.g. QHS2 60 of the first half-bridge circuit and turning on a first low side switch, e.g. QLS2 62 of the first half-bridge circuit.

FIG. 3B is schematic and block diagram of another example power amplifier circuit configuration, according to one or more techniques of this disclosure. FIGS. 3B and 3C are similar to FIG. 3A, except some of the passive components have a different topology.

As with FIGS. 3A and 3C, power amplifier circuit 24B includes a first half-bridge circuit including a first high side switch QHS1 56 and a first low side switch QLS1 58. and a second half-bridge circuit including a second high side switch QHS2 60 and a second low side switch QLS2 62. The first half-bridge circuit and the second half-bridge circuit are arranged as a full-bridge circuit. Controller and driver 28A and power supply 26 function the same as described above for FIG. 3A.

Power supply 26 supplies a DC voltage input VIN to the drains of high side switches QHS1 56 and QHS2 60. The source of high side switch QHS1 56 connects to the drain of low side switch QLS1 58. The source of high side switch QHS2 60 connects to the drain of low side switch QLS2 62. The sources of low side switches QLS1 58 and QLS2 62 connect to ground, in the example of FIG. 3A. The source of QHS1 56 connects to capacitor Cp 50. Capacitor Cp 50 connects to Zload 54 in series and further to the source of QHS2 60. The source of QHS1 56 also connects to ground through inductor L1 76 and capacitor C1 78, which are connected in series. Similarly, the source of QHS2 60 also connects to ground through inductor L2 72 and capacitor C2 74, which are connected in series.

The operation of power amplifier circuit 24B is the same as described above for power amplifier circuit 24A. However, the topology of the examples of FIGS. 3B and 3C may have advantages over the topology of FIG. 3A for wireless power transfer applications. The topology of power amplifiers 24B and 24C may allow ZVS operation over a wider range of load conditions. In some examples, power amplifiers with the topology of power amplifier 24A may lose ZVS operation if the impedance load reflected to the power amplifier is far from the design point of the power amplifier.

FIG. 3C is a schematic and block diagram illustrating another example topology of a power amplifier for use in a WPT system, in accordance with one or more techniques of this disclosure. Power amplifier 24C includes a first half-bridge circuit including a first high side switch QHS1 56 and a first low side switch QLS1 58. and a second half-bridge circuit including a second high side switch QHS2 60 and a second low side switch QLS2 62. The first half-bridge circuit and the second half-bridge circuit are arranged as a full-bridge circuit. Controller and driver 28A and power supply 26 function the same as described above for FIGS. 3A and 3B.

Power supply 26 supplies a DC voltage input VIN to the drains of high side switches QHS1 56 and QHS2 60. The source of high side switch QHS1 56 connects to the drain of low side switch QLS1 58. The source of high side switch QHS2 60 connects to the drain of low side switch QLS2 62. The sources of low side switches QLS1 58 and QLS2 62 connect to ground, in the example of FIGS. 3A and 3B. The source of QHS1 56 connects to capacitor Cp 50. Capacitor Cp 50 connects to Zload 54 in series and further to the source of QHS2 60. Inductor L12 80 connects the sources of QHS1 and QHS2. Inductor L12 80 is also connected in parallel with the series arrangement of Cp 50 and Zload 54. The operation of power amplifier circuit 24C is the same as described above for power amplifier circuits 24A and 24B. As described above, power amplifier circuit 24C may have advantages in WPT applications where the load is variable.

Figure 4A:
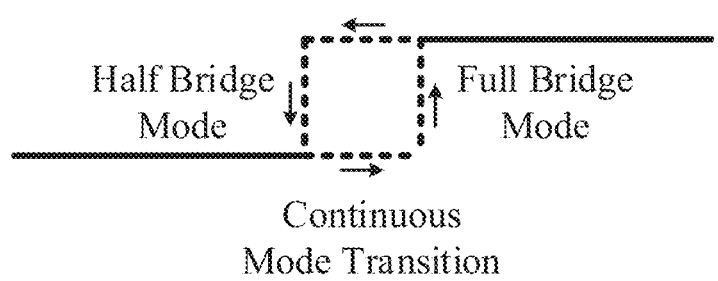
FIG. 4A depicts an example power transfer circuit mode signal that includes a continuous mode transition.

FIG. 4A depicts an example power transfer circuit mode signal that includes a continuous mode transition. As depicted in FIG. 4A, the continuous mode transition operates from an ending time of the half-bridge mode of operation to a starting time of the full-bridge mode of operation. Similarly, though not shown in FIG. 4A, the continuous mode transition may also operate from an ending time of the full-bridge mode of operation to a starting time of the half-bridge mode of operation. The example of FIG. 4A depicts a low-to-high transition when moving from half-bridge to full-bridge mode. In other examples, the transition may differ for a different arrangement of the circuit amplifier circuit. E.g. in some examples, QHS2 60 and QLS2 62 depicted in FIGS. 3A-3C, may be depletion mode MOSFETS, or some other type of switch.

The sense and control circuit of the power transfer circuit, such as MCU 28 or controller and driver 28A may execute the continuous mode transition, sending the continuous mode transition signal to the power amplifier circuit, such as power amplifier circuits 24A-24B. Using the continuous mode transition scheme, the sense and control unit may smoothly transition between full-bridge and half-bridge mode. This will be discussed in more detail in FIGS. 4B and 4C below.

Figure 4B:
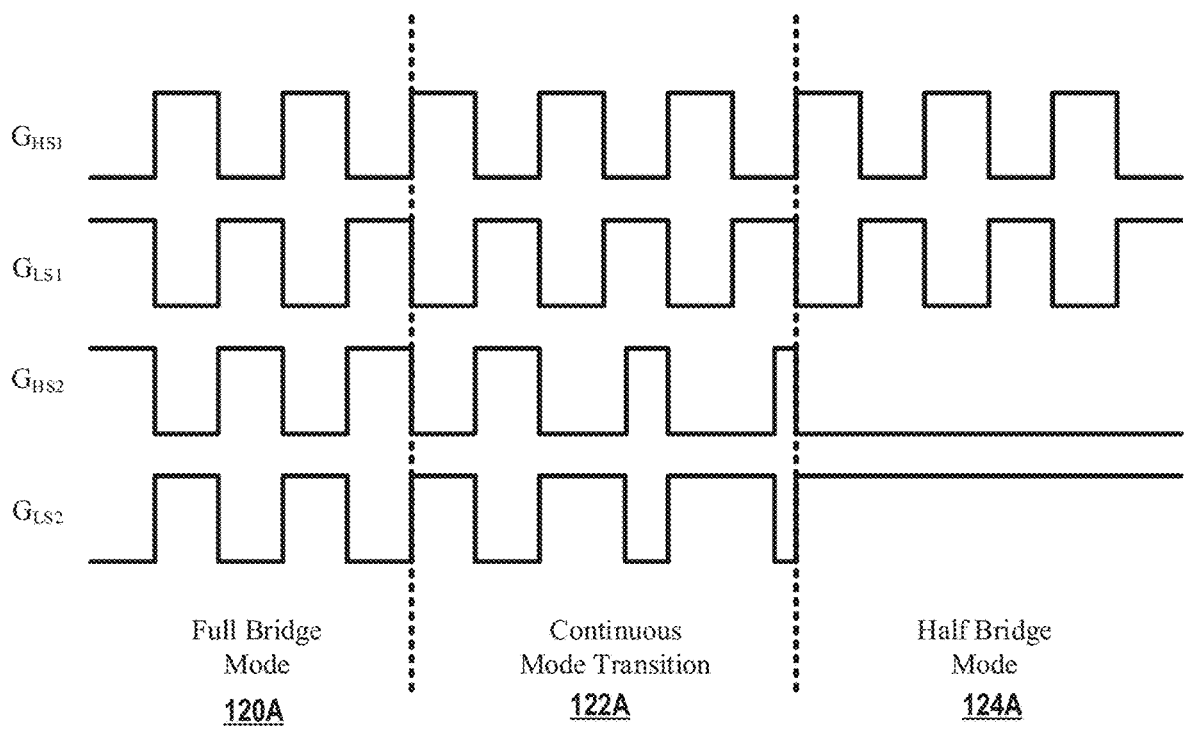
FIG. 4B depicts example gate control signals that transition from full-bridge mode, through a continuous mode transition to half-bridge mode.
Figure 4C:
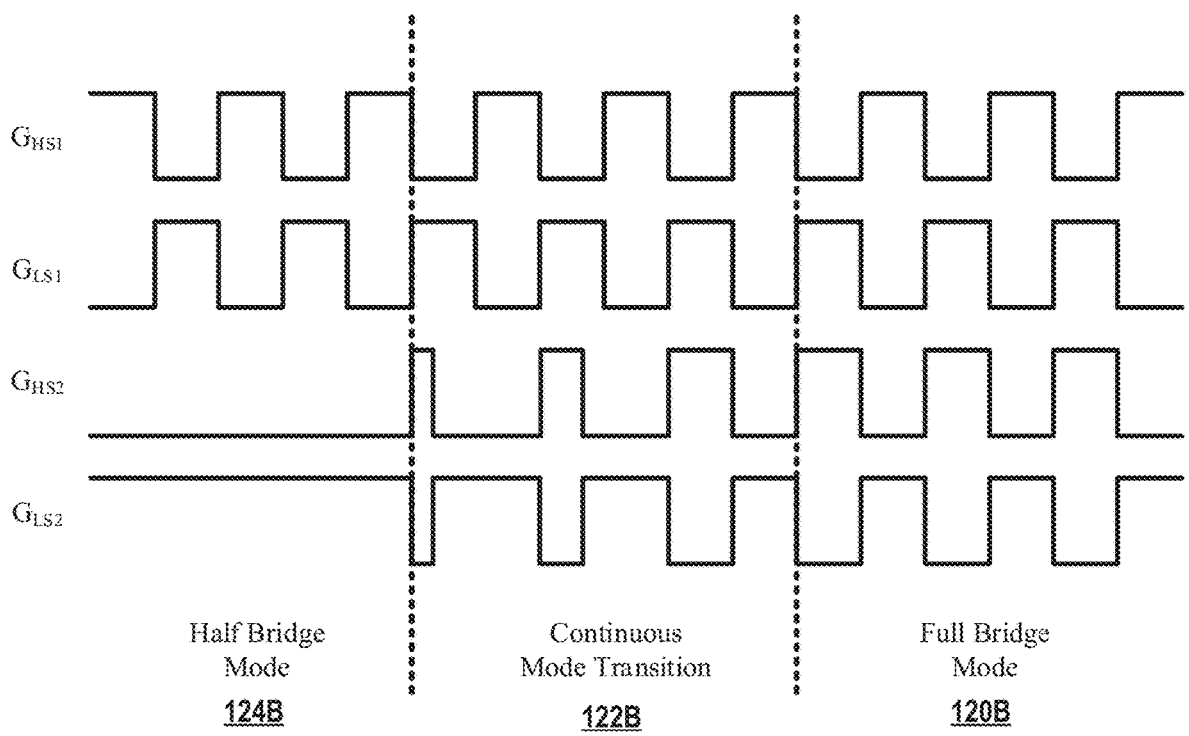
FIG. 4C depicts example gate control signals that transition from half-bridge mode, through a continuous mode transition to full-bridge mode.

FIGS. 4B and 4C depict example control signals that a power amplifier may receive as a component of a WPT, in accordance with one or more techniques of this disclosure.

The square wave signals in FIGS. 4B and 4C are examples of gate control signals from a sense and control unit that may be sent to a power amplifier circuit. The gates GHS1, GLS1, GHS2 and GLS2 correspond to gates GHS1 56, GLS1 58, GHS2 60 and GLS2 62 depicted in FIGS. 3A-3C.

FIG. 4B depicts example gate control signals that transition from full-bridge mode 120A, through a continuous mode transition 122A to half-bridge mode 124A. In half-bridge mode, the gate GHS2 is held low, while gate GLS2 is held high. These gate signals from a sense and control circuit may disable the first half-bridge circuit by turning off and leaving off a first high side switch QHS2 of the first half-bridge circuit and turning on and leaving on a first low side switch QLS2 of the first half-bridge circuit. In other examples the power amplifier may disable the other half-bridge, that includes QHS1 and QLS1 in half-bridge mode. In some examples, a controller, such as controller and driver 28A depicted in FIGS. 3A-3C, may control the duty cycle of the gate signals to smooth the transition between full-bridge and half-bridge mode.

The WPT system may select half-bridge mode when detecting the power requested from the $PR_T$ and received by the PRU. When the power drops below a power threshold, the WPT may turn off one leg of the full-bridge circuit and operate in half-bridge mode.

FIG. 4C depicts example gate control signals that transition from half-bridge mode 124B, through a continuous mode transition 122B to full-bridge mode 120B. In half-bridge mode, the gate GHS2 is held low, while gate GLS2 is held high. When transitioning to full-bridge mode, these gate signals from a sense and control circuit may enable the first half-bridge circuit by allowing the first high side switch QHS2 of the first half-bridge circuit to respond, for example, to pulse width modulation (PWM) signals. Similarly, the sense and control circuit may allow first low side switch QLS2 of the first half-bridge circuit to respond to the PWM signals.

Figure 5:
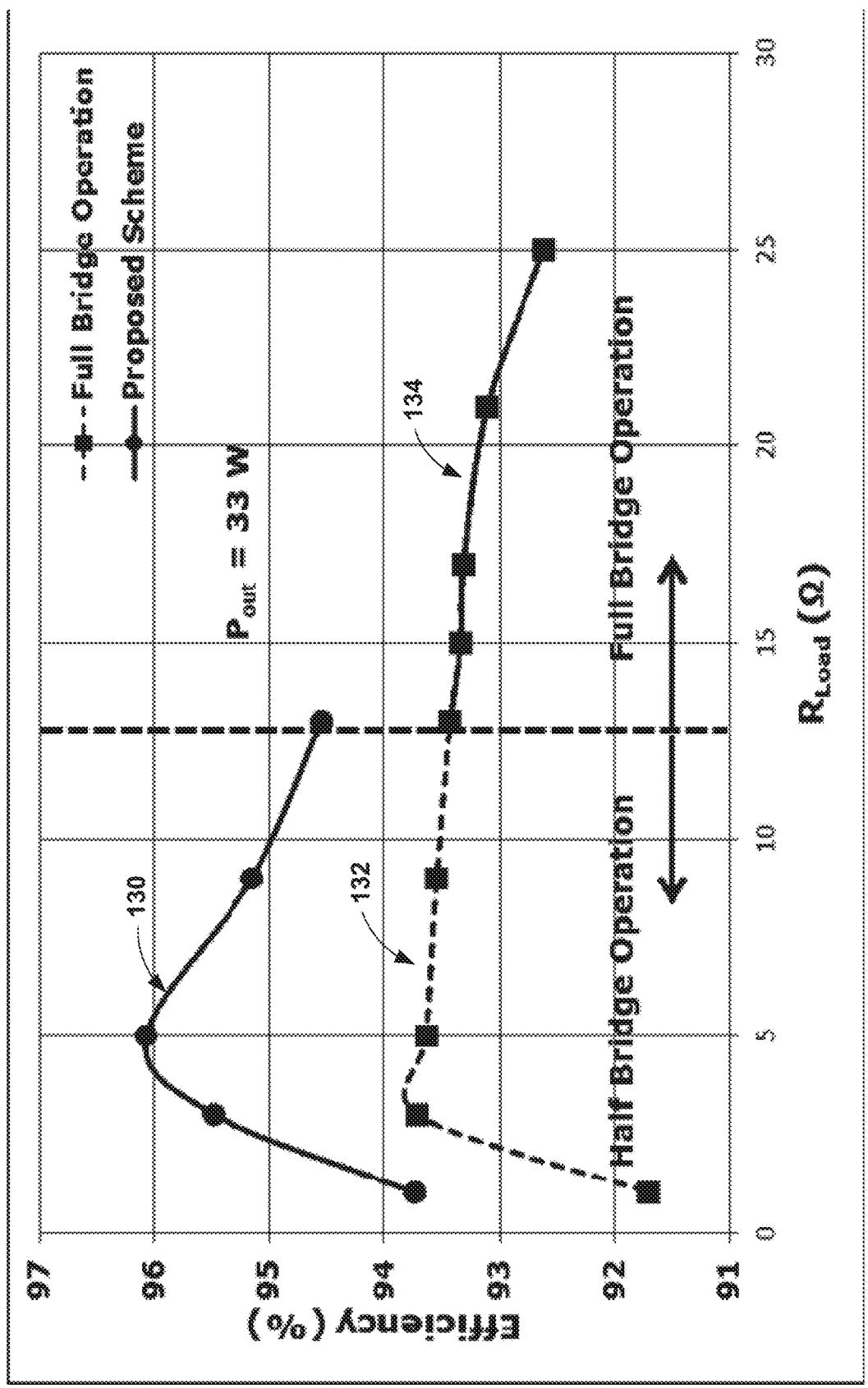
FIG. 5 is a graph illustrating the simulated efficiency of an example power amplifier circuit as the impedance changes.
Figure 6:
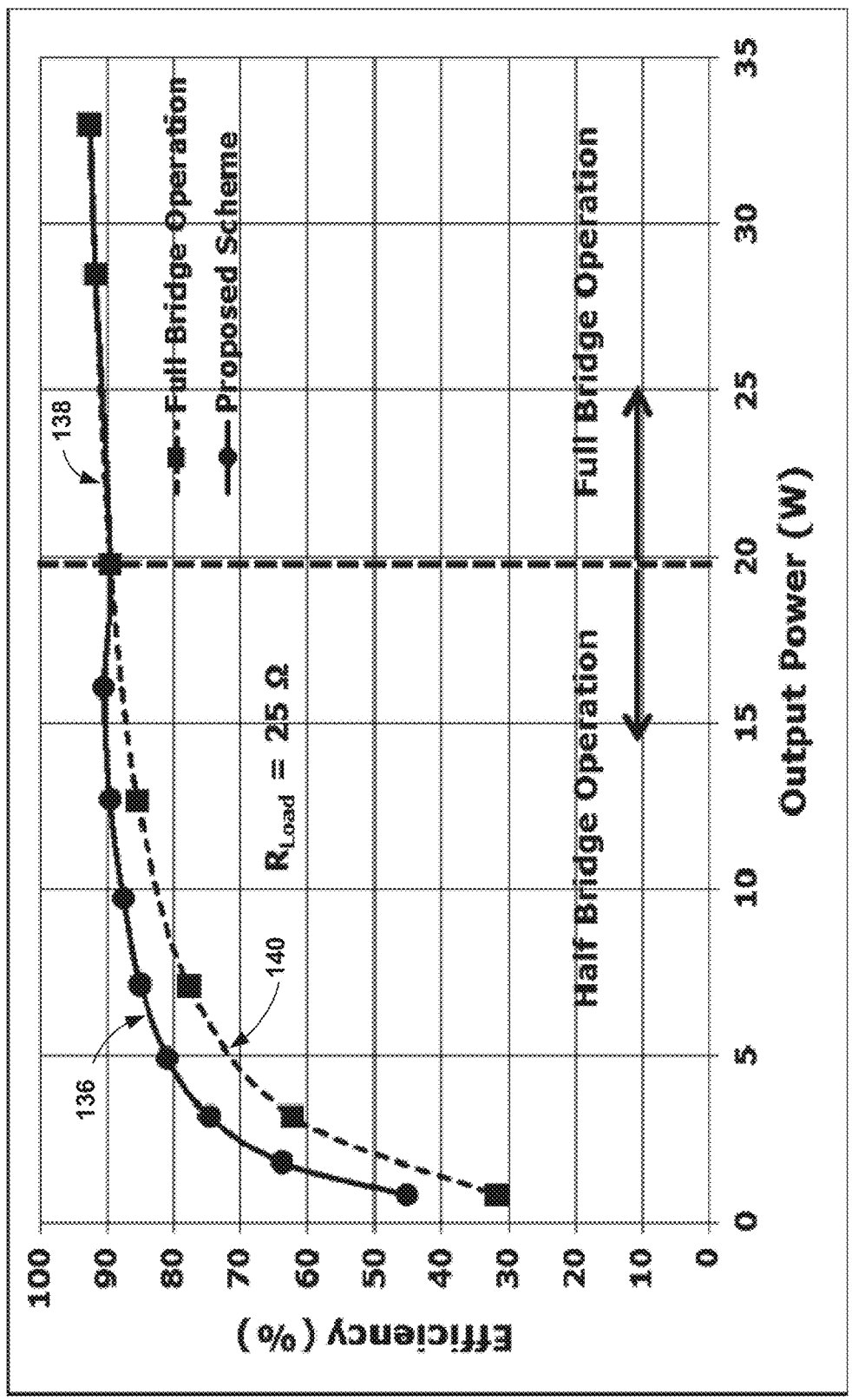
FIG. 6 is a graph illustrating the simulated efficiency of an example power amplifier circuit as the power demand changes.

FIGS. 5 and 6 are graphs illustrating the simulated efficiency of an example power transfer circuit that includes a power amplifier circuit operating according one or more techniques of this disclosure. The graphs illustrate the operation of the example power amplifier circuit 24B, depicted in FIG. 3B with the following example component values: QHS1, QHS2, QLS1, QLS2-IRL60HS118, Lp=8.845 µH, Cp=62.3 pF, L1=L2=150 nH, C1=C2=1 µF.

FIG. 5 is a graph illustrating the simulated efficiency of an example power amplifier circuit as the impedance changes. The graph of FIG. 5 illustrates the efficiency of the power amplifier circuit that maintains an output power of 33 W and varies the impedance from 0-30Ω.

Segment 132 depicts the operation of power amplifier circuit 24B in full-bridge mode with a low impedance load reflected to the power amplifier. In some cases, the efficiency varies from less than 92% to less than 94% as the impedance increases. In contrast, the same power amplifier circuit operating in half-bridge mode over the same impedance range may achieve efficiencies of over 96% as indicated by segment 130. Segment 134 indicates the efficiency of the power amplifier circuit after crossing an impedance threshold, e.g. $R_T$, at approximately 12Ω. The power amplifier circuit switches to full-bridge mode above the impedance threshold. The graph of FIG. 5 illustrates the advantages of the techniques of this disclosure that result in higher efficiency for lower impedance loads when the power amplifier circuit operates in half-bridge mode.

FIG. 6 is a graph illustrating the simulated efficiency of an example power amplifier circuit as the power demand changes. The graph of FIG. 5 illustrates the efficiency of the power amplifier circuit that maintains an Rload of 25Ω and varies the power from 0-33 W.

Segment 138 illustrates the efficiency of example power amplifier circuit 24B operating in full-bridge mode at higher power settings, e.g. greater than 20 W. Segment 136 illustrates operation in half-bridge mode at lower power settings, e.g. less than 20 W. Segment 140 illustrates the efficiency of example power amplifier circuit 24B operating in full-bridge mode at lower power settings, e.g. under 20 W. Comparing segment 140 to segment 136, FIG. 6 illustrates that at for an output power below a power threshold, e.g. $P_T$, of approximately 20 W in this example, that the efficiency of a power amplifier circuit operating in half-bridge mode is more efficient than when operating in full-bridge mode.

Figure 7:
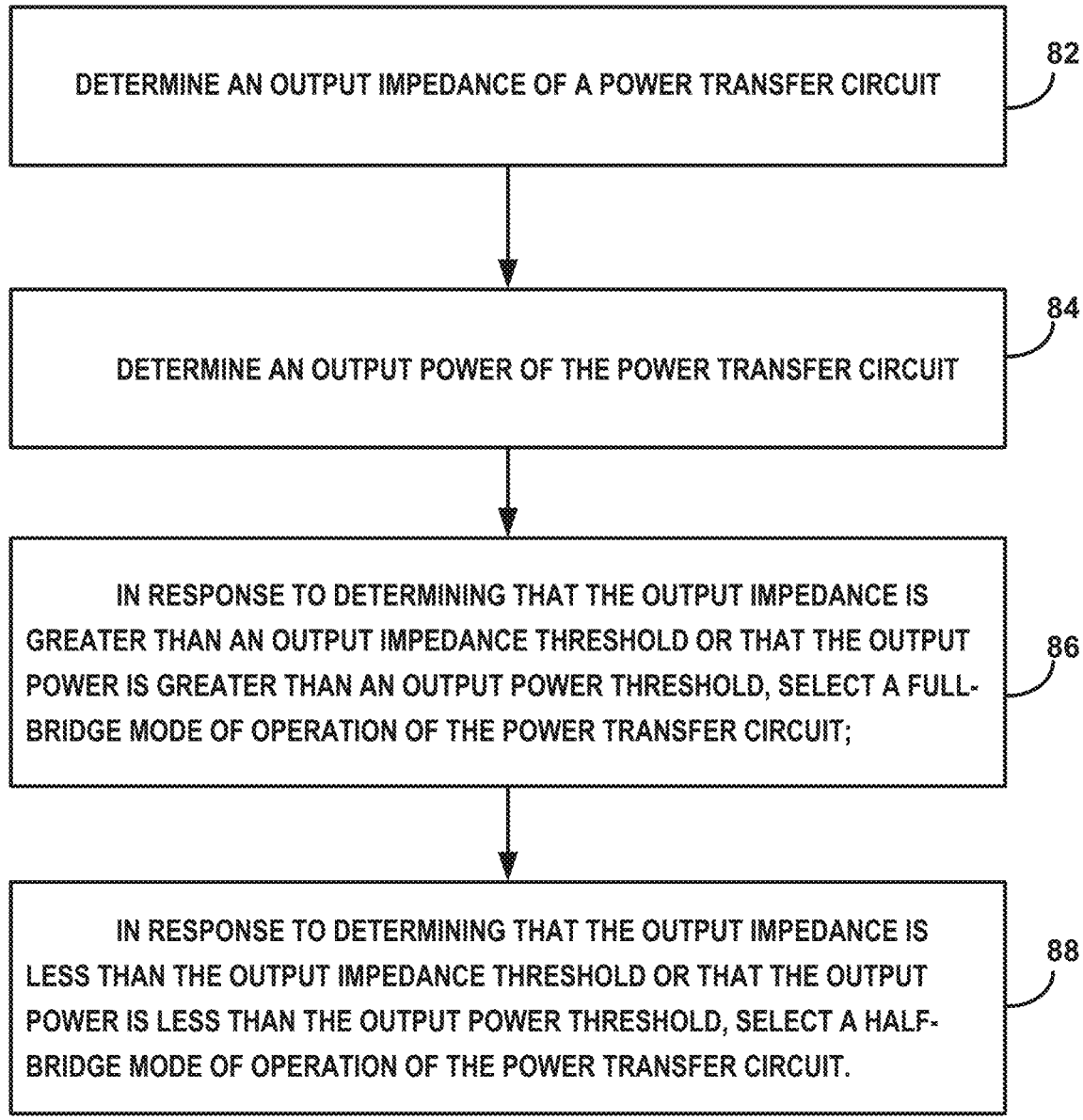
FIG. 7 is a flow chart illustrating an example mode of operation of a wireless power transfer circuit according to one or more techniques of this disclosure.

FIG. 7 is a flow chart illustrating an example mode of operation of a wireless power transfer circuit according to one or more techniques of this disclosure. The steps of FIG. 7 will be described in terms of FIGS. 1B and 2A, unless otherwise noted.

A sense and control unit, e.g. MCU 28 of PTU 20, may determine an output impedance of a power transfer circuit (82), such as the WPT system depicted in FIG. 1B. MCU 28 may receive sensor information from components of PTU 20, such as from matching circuit 22 and power amplifier 24, which may include parameters such as impedance, voltage, power output and other similar parameters. MCU 28 may also receive information from PRU 10 via the out of band signaling communication link. MCU 28 may determine the output impedance reflected to power amplifier 24 as described in relation to FIG. 2A. As discussed in FIG. 1A, the reflected impedance may be affected by the number of PRUs, the type of PRU, e.g. a fitness tracker or a tablet computer and the orientation of the PRU.

MCU 28 may further determine an output power of the power transfer circuit (84). MCU 28 may receive output power information, for example, from power amplifier 24. The load and power requirements can vary significantly. As described above, the output power may depend on the number or type of PRU. For example, a notebook computer may require more power than a mobile phone.

In response to determining that the output impedance is greater than an output impedance threshold, e.g. $R_T$ or $Z_T$, or that the output power is greater than an output power threshold, e.g. $P_T$, MCU 28 may select a full-bridge mode of operation of the power transfer circuit (86). In other words, in a full-bridge mode, both half bridges operate synchronously with a high input voltage when the load and/or the power requirements are high.

In response to determining that the output impedance is less than the output impedance threshold or that the output power is less than the output power threshold, MCU 28 may select a half-bridge mode of operation of the power transfer circuit. As described, for example in relation to FIGS. 5 and 6 above, the half-bridge mode of operation may be more efficient at lower power or low impedance situations.

As described above, the WPT system of this disclosure operates the Class D topology in the full bridge mode during high power or high impedance operation as well as when $V_{DCin}$ exceeds a threshold. During low power and low impedance operation the amplifier is operated in the half bridge mode by turning off the high side switch of one of the half bridges and keeping the low side switch turned on. These techniques may provide advantages over conventional WPT systems. As one example, the efficiency of the power amplifier may be improved by the techniques described in this disclosure because the driver and switching losses are reduced during low power and low impedance operation in half-bridge mode as described in FIGS. 3A-3C above. The power and reflected impedance thresholds may be set to half or less than half of the maximum rated power and maximum reflected impedance that the PTU sees in the wireless power transfer application. The impedance and the power thresholds may also be adjusted based on the operating conditions such as the ambient temperature.

The techniques of this disclosure operate on the customer level (e.g. the product of the customer). These techniques describe the operation of the power amplifier portion of the total system. In some examples, as shown in FIGS. 1B and 2A, a complete solution may include a resonator, such as Tx resonator 21, with a matching circuit, e.g. matching circuit 22. The combined resonator and matching circuit replace Zload in FIGS. 3A-3C. A processor, such as MCU 28, with communication capability, and a driver IC, such as controller and driver 28A may drive power amplifier 24 as described above in relation to FIGS. 3A-3C and 4A-4C. In some examples $V_{DCin}$ may come from a pre-regulator.

Figure 8:
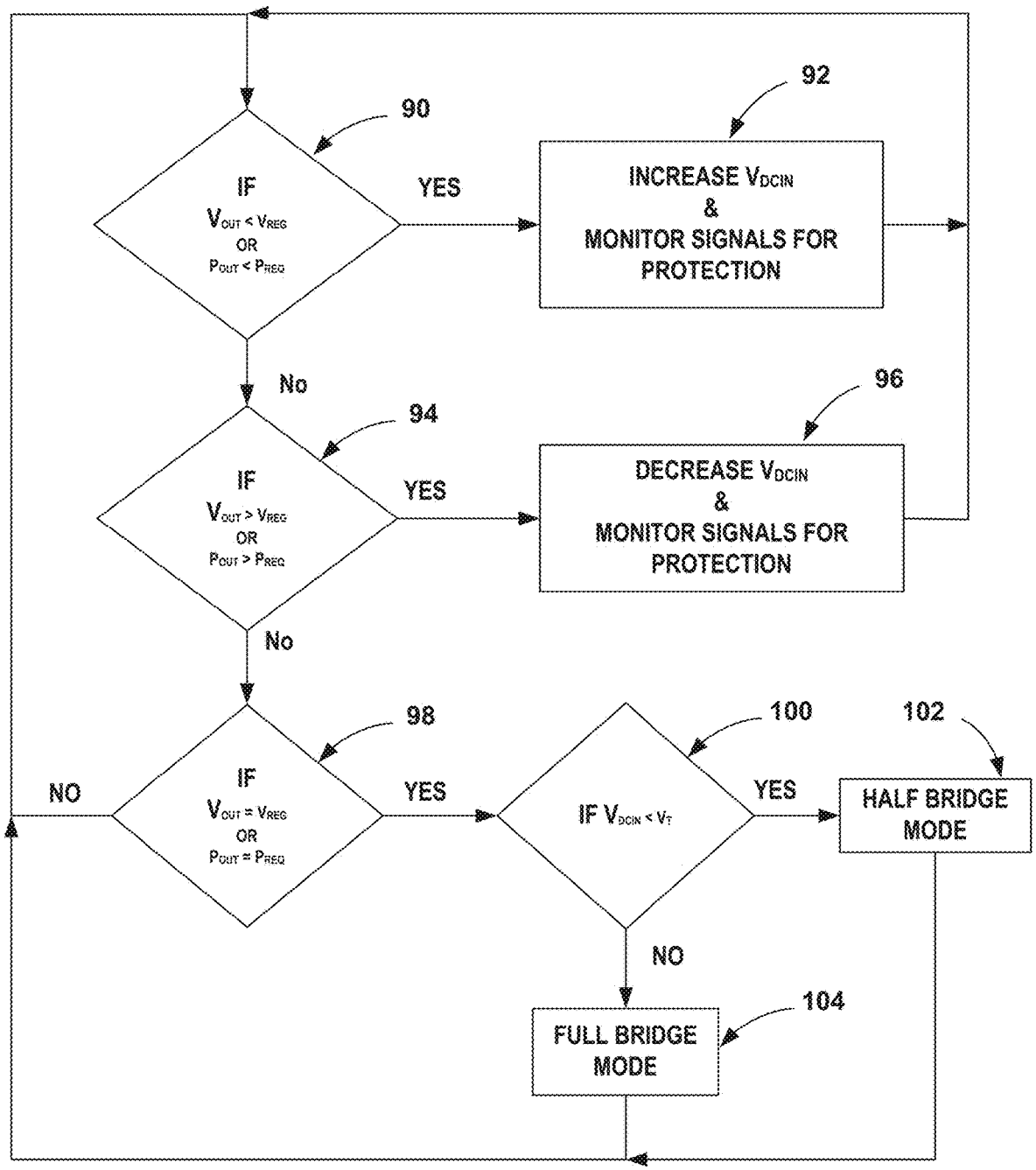
FIG. 8 is a flow chart illustrating another example mode of operation of a wireless power transfer circuit according to one or more techniques of this disclosure.

FIG. 8 is a flow chart illustrating another example mode of operation of a wireless power transfer circuit according to one or more techniques of this disclosure. FIG. 8 depicts the decision process for determining an example operating mode. In FIG. 8, Vreg is the voltage out of the DC to DC block 14 of PRU 10 depicted in the upper half of FIG. 1B. In other words, Vreg is the voltage delivered to PRU load 16.

The example control algorithm of FIG. 8 will first set the system into a at least temporary stable state. Once a stable state has been achieved, as explained in the upper half of FIG., the control algorithm will compare the DC input voltage $V_{DCin}$ to a threshold voltage $V_T$. $V_{DCin}$ corresponds to the input voltage VIN that is output from power supply 26 to power amplifier 24A-24C, as shown in FIGS. 3A-3C. $V_T$ may be set at less than half and in some examples, may be set significantly less than half of the maximum input voltage to the power amplifier. This voltage threshold setting may vary depending on the system parameters of the specific implementation. Furthermore, the transition between modes can be achieved smoothly by continuous mode transition switching scheme as described above in relation to FIGS. 4C-4C.

FIG. 8 is based on determining the transition between modes (full-bridge or half-bridge) by observing the input voltage to the power amplifier because the power delivered by the PTU depends on the input voltage and the reflected impedance, as described above, for example, in relation to FIG. 2C. Therefore, the PTU may increase or decrease the input voltage to the power amplifier, e.g. power amplifier 24 for regulating the output voltage of the DC to DC converter 14, or regulating power delivered to the receiving unit, e.g. PRU 10, depicted in FIG. 1B. In other words, PTU 20, through MCU 28 may control the output of power supply 26 to regulate the power and/or voltage received at PRU load 16. As described above, PRU 10 may communicate certain parameters, such as power received or output voltage of DC to DC converter 14 to PTU 20 via the communication link. Thus, a measure of input voltage to power amplifier 24 may give PTU 20 the information about the power levels and impedance conditions depending on the positional changes of the PRU.

In the description below, Vreg indicates an output voltage setpoint of DC to DC converter 14, while Vout indicates the output voltage of the DC to DC converter 14. Also, Pout indicates the power level output from DC to DC converter 14 to PRU load 16, while Preg indicates the power level setpoint for PRU load 16. PRU 10 may communicate these parameters to the sense and control unit, e.g. MCU 28, of PTU 20.

During operation, the sense and control unit MCU 28 of PTU 20 may determine an output voltage Vout of the DC to DC converter 14 of PRU 10. The sense and control unit MCU 28 of PTU 20 may also determine the power level received by PRU load 16 of PRU 10.

In response to determining that the output voltage Vout is less than an output voltage setpoint Vreg, or that the power level Pout is less than a power level setpoint Preg, (90) MCU 28 may increase the magnitude of the direct current (DC) input voltage $V_{DCin}$ to power amplifier 24 (92). MCU 28 may also monitor other parameters and information sent by PRU 10 for safety and device protection (92). This is the YES branch of block 90. The monitoring function from block 92 goes back to block 90.

Following the NO branch from block 90, in response to determining that the output voltage Vout of DC to DC converter 14 is greater than the output voltage setpoint Vreg, or that the power level Pout is greater than the power level setpoint Preg, (94) MCU 28 may decrease the DC input voltage $V_{DCin}$ (96). MCU 28 may also monitor other parameters and information sent by PRU 10 for safety and device protection (92). This is the YES branch of block 94. The monitoring function from block 96 goes back to block 90.

Following the NO branch from block 94, in response to determining that the output voltage Vout equals the output voltage setpoint Vreg or the power level Pout is equal to the power level setpoint Preg (98), MCU 28 may follow the YES branch from block 98. MCU 28 may further determine whether the DC input voltage $V_{DCin}$ is less than a DC input voltage threshold $V_T$ (100).

Following the YES branch from block 100, in response to determining that the DC input voltage $V_{DCin}$ is less than the DC input voltage threshold $V_T$, MCU 28 may select half-bridge mode of operation (102). Following the NO branch from block 100, in response to determining that the DC input voltage $V_{DCin}$ is greater than the input voltage threshold $V_T$, MCU 28 may select the full-bridge mode of operation (104). Once MCU 28 selects either half-bridge mode or full-bridge mode, or after following the NO branch from block 98, MCU 28 may continue to monitor the voltage and power parameters of PRU 10 (90).

In one or more examples, the functions described above may be implemented in hardware, software, firmware, or any combination thereof. For example, the various components of FIG. 1B, such as MCU 28, may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

By way of example, and not limitation, such computer-readable storage media, can comprise RAM, ROM, EEPROM, flash memory, or any other medium that can be used to store desired program code in the form of instructions or data structures and that can be accessed by a computer. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Example 1. A method comprising: determining, by a sense and control unit, an output impedance of a power transfer circuit and determining, by a sense and control unit, an output power of the power transfer circuit. In response to determining that the output impedance is greater than an output impedance threshold or that the output power is greater than an output power threshold, selecting, by the sense and control unit, a full-bridge mode of operation of the power transfer circuit, and in response to determining that the output impedance is less than the output impedance threshold or that the output power is less than the output power threshold, selecting, by the sense and control unit, a half-bridge mode of operation of the power transfer circuit.

Example 2. The method of example 1, wherein the power transfer circuit comprises a first half-bridge circuit and a second half-bridge circuit, the method further comprising selecting the half-bridge mode of operation comprises disabling the first half-bridge of the power transfer circuit.

Example 3. The method of any of examples 1-2 or any combination thereof, wherein the first half bridge circuit comprises a high side switch and a low side switch and disabling the first half-bridge circuit comprises turning off the high side switch of first half-bridge circuit and turning on the low side switch of the first half-bridge circuit.

Example 4. The method of any combination of examples 1-3, wherein further comprising, executing, by the sense and control unit, a continuous mode transition, wherein the sense and control unit executes the continuous mode transition: from an ending time of the half-bridge mode of operation to a starting time of the full-bridge mode of operation, and from an ending time of the full-bridge mode of operation to a starting time of the half-bridge mode of operation Example 5. The method of any combination of examples 1-4, the method further comprising further comprising: determining by the sense and control unit, a DC input voltage of the power transfer circuit, in response to determining that the DC input voltage greater than a DC input voltage threshold, selecting, by the sense and control circuit, a full-bridge mode of operation of the power transfer circuit, and in response to determining that the DC input voltage is less than a DC input voltage threshold, selecting, by the sense and control unit, a half-bridge mode of operation of the power transfer circuit.

Example 6. The method of any combination of examples 1-5, wherein the power transfer circuit includes a maximum DC input voltage and the DC input voltage threshold is half of the maximum DC input voltage.

Example 7. The method of any combination of examples 1-6, wherein the power transfer circuit includes a maximum rated power output and the output power threshold is half of the maximum rated power output Example 8. The method of any combination of examples 1-7, wherein the power transfer circuit includes a maximum reflected impedance and the output impedance threshold is half of the maximum reflected impedance.

Example 9. The method of any combination of examples 1-8, wherein the sense and control unit adjusts the output power threshold and the sense and control unit adjusts the output impedance threshold based in part on operating conditions of the power transfer circuit, wherein the operating conditions comprise: ambient temperature, resonator current and power supply voltage.

Example 10. The method of any combination of examples 1-9, further comprising: determining, by the sense and control unit, an output voltage of a power receiving unit (PRU), determining, by the sense and control unit, a power level received by the PRU, in response to determining that the output voltage is less than an output voltage setpoint or that the power level is less than a power level setpoint, increasing, by the sense and control unit, a direct current (DC) input voltage. In response to determining that the output voltage is greater than the output voltage setpoint or that the power level is greater than the power level setpoint, decreasing, by the sense and control unit, the DC input voltage. In response to determining that the output voltage equals the output voltage setpoint or the power level is equal to the power level setpoint, further determining, by the sense and control unit, whether the DC input voltage is less than a DC input voltage threshold. In response to determining that the DC input voltage is less than the DC input voltage threshold, selecting, by the sense a control unit, the half-bridge mode of operation, and in response to determining that the DC input voltage is greater than the input voltage threshold, selecting, by the sense a control unit, a full-bridge mode of operation.

Example 11. A sense and control circuit, comprising: a first sensing circuitry, wherein the first sensing circuitry is configured to determine an impedance reflected to a power amplifier circuit, a second sensing circuitry, wherein the second sensing circuitry is configured to determine an output power of the power amplifier circuit, and a third sensing circuitry, wherein the third sensing circuitry is configured to determine a DC input voltage of the power amplifier circuit. In response to determining that: the impedance reflected to the power amplifier circuit is greater than an impedance threshold, the output power is greater than an output power threshold, or that the DC input voltage is greater than a DC input voltage threshold, the sense and control circuitry is configured to select a full-bridge mode of operation of the power amplifier circuit. In response to determining that: the impedance reflected to the power amplifier circuit is less than the impedance threshold, the output power is less than the output power threshold, or that the DC input voltage is less than a DC input voltage threshold, the sense and control circuit is configured to select a half-bridge mode of operation of the power amplifier circuit.

Example 12. The sense and control circuit of example 11, wherein the sense and control circuit is configured to select the half-bridge mode of operation comprises disabling a first half-bridge of the power amplifier circuit.

Example 13. The sense and control circuit of any combination of examples 11-12, wherein the sense and control circuit is configured to disable the first half-bridge circuit by turning off a first high side switch of the first half-bridge circuit and turning on a first low side switch of the first half-bridge circuit.

Example 14. A device for wireless power transfer, the device comprising: a power amplifier circuit and a sense and control circuit. The power amplifier circuit includes: a first half-bridge circuit comprising a first high side switch and a first low side switch, and a second half-bridge circuit comprising a second high side switch and a second low side switch, wherein the first half-bridge circuit and the second half-bridge circuit are arranged as a full-bridge circuit. The sense and control circuit is configured to: determine an impedance reflected to the power amplifier circuit, determine an output power of the power amplifier circuit, in response to determining that the impedance reflected to the power amplifier circuit is greater than an impedance threshold or that the output power is greater than an output power threshold, select a full-bridge mode of operation of the power amplifier circuit. In response to determining that the impedance reflected to the power amplifier circuit is less than the impedance threshold or that the output power is less than the output power threshold, select a half-bridge mode of operation of the power amplifier circuit.

Example 15. The device of example 14, the sense and control circuit is further configured to determine a DC input voltage of the power amplifier circuit. In response to determining that the DC input voltage of the power amplifier circuit is greater than a DC input voltage threshold, select a full-bridge mode of operation of the power amplifier circuit, and in response to determining that the DC input voltage of the power amplifier circuit is less than the DC input voltage threshold, select a half-bridge mode of operation of the power amplifier circuit.

Example 16. The device of any combination of examples 14-15, wherein selecting the half-bridge mode of operation comprises disabling the first half-bridge circuit, including turning off the first high side switch of the first half-bridge circuit and turning on the first low side switch of the first half-bridge circuit.

Example 17. The device of any combination of examples 14-16, wherein the sense and control circuit includes a continuous mode transition, and the sense and control circuit is further configured to execute the continuous mode transition: from an ending time of the half-bridge mode of operation to a starting time of the full-bridge mode of operation, and from an ending time of the full-bridge mode of operation to a starting time of the half-bridge mode of operation.

Example 18. The device of any combination of examples 14-17, wherein the power amplifier circuit includes a maximum DC input voltage and the DC input voltage threshold is half of the maximum DC input voltage.

Example 19. The device of any combination of examples 14-16, wherein the power transfer circuit includes a maximum reflected impedance and the impedance threshold is half of the maximum reflected impedance.

Example 20. The device of any combination of examples 14-16, wherein the sense and control circuit adjusts the output power threshold and the sense and control circuit adjusts the impedance threshold based in part on operating conditions of the power transfer circuit, wherein the operating conditions comprise: ambient temperature, resonator current and power supply voltage.

Various examples of the disclosure have been described. These and other examples are within the scope of the following claims.

The invention claimed is:

1. A method comprising:
    detecting, by a sense and control unit, a load impedance reflected to a power transfer circuit, wherein the power transfer circuit comprises:
        a full bridge circuit comprising:
            a first half-bridge circuit comprising a first high side switch and a first low side switch; and
            a second half bridge circuit comprising a second high side switch and a second low side switch;
        a first inductor and first capacitor in series that connect the drain of the first low side switch to the source of the first low side switch;
        a second inductor and second capacitor in series that connect the drain of the second low side switch to the source of the second low side switch, wherein the reflected load impedance is coupled in series with a capacitor and coupled between the drain of the first low side switch and the drain of the second low side switch;
    determining, by the sense and control unit, an output power of the power transfer circuit;
    determining, by the sense and control unit, whether the reflected load impedance is less than an impedance threshold, and in response to determining that the reflected load impedance is less than the impedance threshold, selecting, by the sense and control unit, a half-bridge mode of operation of the power transfer circuit, wherein an efficiency of the power transfer circuit in the half-bridge mode of operation is improved over a full-bridge mode of operation of the power transfer circuit during operation when the reflected load impedance less than the impedance threshold;
    determining, by the sense and control network, whether the output power is less than the output power threshold and in response to determining that the output power is less than the output power threshold, selecting, by the sense and control unit, a half-bridge mode of operation of the power transfer circuit, wherein the efficiency of the power transfer circuit in the half-bridge mode of operation is improved over a full-bridge mode of operation of the power transfer circuit during operation when either:
        the reflected load impedance less than the impedance threshold, or
        the output power less than the output power threshold;
    determining, by the sense and control network, whether the reflected load impedance has crossed the impedance threshold, and in response to determining, by the sense and control unit, that the reflected load impedance has crossed the impedance threshold and is greater than the impedance threshold, selecting, by the sense and control unit, a full-bridge mode of operation of the power transfer circuit, wherein the efficiency of the power transfer circuit in full-bridge mode of operation is improved over the half-bridge mode of operation during operation when the reflected load impedance is greater than the impedance threshold;
    determining, by the sense and control network, whether the output power has crossed the output power threshold, and in response to determining, by the sense and control unit, that the output power is greater than the output power threshold, selecting, by the sense and control unit, a full-bridge mode of operation of the power transfer circuit, wherein the efficiency of the power transfer circuit in the full-bridge mode of operation is improved over a half-bridge mode of operation of the power transfer circuit during operation when either:
the reflected load impedance greater than the impedance threshold, or
the output power greater than the output power threshold.

2. The method of claim 1, wherein selecting the half-bridge mode of operation comprises disabling the first half-bridge of the power transfer circuit.

3. The method of claim 2, disabling the first half-bridge circuit comprises turning off the high side switch of first half-bridge circuit and turning on the low side switch of the first half-bridge circuit.

4. The method of claim 1, further comprising:
determining by the sense and control unit, a DC input voltage of the power transfer circuit;
in response to determining that the DC input voltage is greater than a DC input voltage threshold, selecting, by the sense and control circuit, a full-bridge mode of operation of the power transfer circuit; and
in response to determining that the DC input voltage is less than or equal to a DC input voltage threshold, selecting, by the sense and control unit, a half-bridge mode of operation of the power transfer circuit.

5. The method of claim 4,
wherein the power transfer circuit rated to operate at a maximum DC input voltage,
the method further comprising, adjusting the DC input voltage threshold to half of the maximum DC input voltage.

6. The method of claim 1,
wherein the power transfer circuit is rated to operate at a maximum rated power output,
the method further comprising, adjusting the output power threshold such that the output power threshold is half of the maximum rated power output.

7. The method of claim 1,
wherein the power transfer circuit comprises a transmit resonator,
wherein the power transfer circuit is rated to operate at a maximum impedance reflected to the power transfer circuit through the transmit resonator,
the method further comprising, adjusting the impedance threshold to half of the maximum rated impedance.

8. The method of claim 1, wherein the sense and control unit adjusts the output power threshold and the sense and control unit adjusts the impedance threshold based in part on operating conditions of the power transfer circuit, wherein the operating conditions comprise one or more of ambient temperature, resonator current and power supply voltage.

9. The method of claim 1, further comprising:
determining, by the sense and control unit, an output voltage of a power converter of a power receiving unit (PRU), wherein the power converter unit comprises a component of the PRU and wherein the power converter unit supplies power received from the power transfer circuit to the PRU;
determining, by the sense and control unit, a power level received by the PRU,
in response to determining that the output voltage is less than an output voltage setpoint or that the power level is less than a power level setpoint, increasing, by the sense and control unit, a direct current (DC) input voltage;
in response to determining that the output voltage is greater than the output voltage setpoint or that the power level is greater than the power level setpoint, decreasing, by the sense and control unit, the DC input voltage;
in response to determining that the output voltage equals the output voltage setpoint or the power level is equal to the power level setpoint, further determining, by the sense and control unit, whether the DC input voltage is less than a DC input voltage threshold;
in response to determining that the DC input voltage is less than the DC input voltage threshold, selecting, by the sense a control unit, the half-bridge mode of operation; and
in response to determining that the DC input voltage is greater than the input voltage threshold, selecting, by the sense a control unit, a full-bridge mode of operation.

10. A sense and control circuit, comprising:
sensing circuitry configured to:
detect an impedance reflected to a transmit resonator connected to a power amplifier circuit,
determine an output power of the power amplifier circuit; and
determine a DC input voltage of the power amplifier circuit,
wherein:
in response to determining that the impedance reflected to the transmit resonator connected to the power amplifier circuit is greater than an impedance threshold, the sense and control circuitry is configured to select a full-bridge mode of operation of the power amplifier circuit;
in response to determining that the output power is greater than an output power threshold, the sense and control circuitry is configured to select a full-bridge mode of operation of the power amplifier circuit;
in response to determining that the DC input voltage is greater than a DC input voltage threshold, the sense and control circuitry is configured to select a full-bridge mode of operation of the power amplifier circuit;
in response to determining that the impedance reflected to the power amplifier circuit is less than the impedance threshold, the sense and control circuit is configured to select a half-bridge mode of operation of the power amplifier circuit;
in response to determining that the output power is less than the output power threshold, the sense and control circuit is configured to select a half-bridge mode of operation of the power amplifier circuit; and
in response to determining that the DC input voltage is less than a DC input voltage threshold, the sense and control circuit is configured to select a half-bridge mode of operation of the power amplifier circuit,
wherein the power amplifier circuit comprises:
a full bridge circuit comprising:
a first half-bridge circuit comprising a first high side switch and a first low side switch; and
a second half bridge circuit comprising a second high side switch and a second low side switch;
a first inductor and first capacitor in series that connect the drain of the first low side switch to the source of the first low side switch;

a second inductor and second capacitor in series that connect the drain of the second low side switch to the source of the second low side switch, wherein the reflected load impedance is coupled in series with a capacitor and coupled between the drain of the first low side switch and the drain of the second low side switch.

11. The sense and control circuit of claim 10, wherein to select the half-bridge mode of operation comprises disabling the first half-bridge of the power amplifier circuit.

12. The sense and control circuit of claim 11, wherein the sense and control circuit is configured to disable the first half-bridge circuit by turning off the first high side switch of the first half-bridge circuit and turning on the first low side switch of the first half-bridge circuit.

13. A device for wireless power transfer, the device comprising:
   a transmit resonator;
   a power amplifier circuit that includes:
      a first half-bridge circuit comprising a first high side switch and a first low side switch; and
      a second half-bridge circuit comprising a second high side switch and a second low side switch,
      a first inductor and first capacitor in series that connect the drain of the first low side switch to the source of the first low side switch;
      a second inductor and second capacitor in series that connect the drain of the second low side switch to the source of the second low side switch, wherein
      the first half-bridge circuit and the second half-bridge circuit are arranged as a full-bridge circuit; and
   a sense and control circuit that is configured to:
      detect an impedance reflected to the power amplifier circuit via the transmit resonator;
      determine an output power of the power amplifier circuit;
      in response to determining that the impedance reflected to the power amplifier circuit is greater than an impedance threshold, select a full-bridge mode of operation of the power amplifier circuit, wherein the reflected impedance is coupled in series with a capacitor and coupled between the drain of the first low side switch and the drain of the second low side switch;
      in response to determining that the output power is greater than an output power threshold, select a full-bridge mode of operation of the power amplifier circuit;
      in response to determining that the impedance reflected to the power amplifier circuit is less than the impedance threshold, select a half-bridge mode of operation of the power amplifier circuit; and
      in response to determining that the output power is less than the output power threshold, select a half-bridge mode of operation of the power amplifier circuit.

14. The device of claim 13, wherein the sense and control circuit is further configured to determine a DC input voltage of the power amplifier circuit;
   in response to determining that the DC input voltage of the power amplifier circuit is greater than a DC input voltage threshold, select a full-bridge mode of operation of the power amplifier circuit; and
   in response to determining that the DC input voltage of the power amplifier circuit is less than the DC input voltage threshold, select a half-bridge mode of operation of the power amplifier circuit.

15. The device of claim 14, wherein selecting the half-bridge mode of operation comprises disabling the first half-bridge circuit, including turning off the first high side switch of the first half-bridge circuit and turning on the first low side switch of the first half-bridge circuit.

16. The device of claim 13, wherein
   the sense and control circuit is further configured to execute a continuous mode transition that avoids an abrupt change between the half-bridge mode of operation and the full-bridge mode of operation, and
   the sense and control circuit is further configured to execute the continuous mode transition:
      from an ending time of the half-bridge mode of operation to a starting time of the full-bridge mode of operation; and
      from an ending time of the full-bridge mode of operation to a starting time of the half-bridge mode of operation.

17. The device of claim 13,
wherein the power amplifier circuit is rated to operate at a maximum rated power output, and
the sense and control circuit that is configured to adjust the output power threshold to half of the maximum rated power output.

18. The device of claim 13,
wherein the power transfer circuit is rated to operate at a maximum impedance reflected to the power transfer circuit through the transmit resonator, and
the sense and control circuit that is configured to adjust the impedance threshold to half of the maximum rated impedance.

19. The device of claim 13, wherein the sense and control circuit is configured to adjust the output power threshold and the impedance threshold based in part on operating conditions of the power transfer circuit, wherein the operating conditions comprise one or more of ambient temperature, resonator current and power supply voltage.

* * * * *